US012600494B2

(12) United States Patent
Kishida et al.

(10) Patent No.: US 12,600,494 B2
(45) Date of Patent: Apr. 14, 2026

(54) MANUFACTURING FACILITY AND METHOD

(71) Applicant: TOYOTA JIDOSHA KABUSHIKI KAISHA, Toyota (JP)

(72) Inventors: Kei Kishida, Nisshin (JP); Takehiro Yamada, Nagoya (JP); Hiroaki Yoshitomi, Toyota (JP); Kazuhiko Terai, Nagoya (JP); Koichiro Hayashi, Anjo (JP); Tsuyoshi Okada, Nagoya (JP); Shotaro Suzuki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/083,791

(22) Filed: Mar. 19, 2025

(65) Prior Publication Data

US 2025/0296702 A1     Sep. 25, 2025

(30) Foreign Application Priority Data

Mar. 21, 2024     (JP) ................................. 2024-045453

(51) Int. Cl.
| *B64F 5/10* | (2017.01) |
| *B64F 5/50* | (2017.01) |
| *E04H 5/02* | (2006.01) |

(52) U.S. Cl.
CPC .................. *B64F 5/10* (2017.01); *B64F 5/50* (2017.01); *E04H 5/02* (2013.01)

(58) Field of Classification Search
CPC ...... B64F 5/10; B64F 5/00; B64F 5/50; E04H 5/02; E04H 5/00

USPC ........................................ 29/897.2, 897, 592
See application file for complete search history.

(56) References Cited

U.S. PATENT DOCUMENTS

| 4,018,306 | A | * | 4/1977 | Lyons | ...................... A62B 1/00 |
| | | | | | 104/235 |
| 4,640,214 | A | * | 2/1987 | Bruns | ..................... B63C 15/00 |
| | | | | | 428/116 |
| 4,726,316 | A | * | 2/1988 | Bruns | ..................... B63B 35/44 |
| | | | | | 114/263 |
| 7,162,368 | B2 | * | 1/2007 | Levi | ....................... G01C 21/28 |
| | | | | | 701/300 |
| 7,971,468 | B2 | * | 7/2011 | Coalson | ............... B21D 26/023 |
| | | | | | 72/405.09 |
| 8,789,269 | B2 | * | 7/2014 | Kilibarda | ............... G06Q 50/04 |
| | | | | | 29/430 |
| 8,866,586 | B2 | * | 10/2014 | Hayashi | .............. H04L 63/0861 |
| | | | | | 340/5.81 |
| 9,579,679 | B2 | * | 2/2017 | Mathis | ................... B05B 13/005 |
| 9,777,502 | B2 | * | 10/2017 | Curlander | ............... B64F 1/025 |
| 9,839,986 | B2 | * | 12/2017 | Best | ........................... B64F 5/10 |
| 11,338,938 | B2 | * | 5/2022 | Adamson | ................ B64C 25/16 |
| 11,834,181 | B2 | * | 12/2023 | Benner | .................. B64U 80/25 |

(Continued)

FOREIGN PATENT DOCUMENTS

JP     2022-081433 A     5/2022

*Primary Examiner* — Lawrence Averick
(74) *Attorney, Agent, or Firm* — Dinsmore & Shohl LLP

(57)     ABSTRACT

A multi-story manufacturing facility includes a movement mechanism configured to move, to a second story above a first story, a main body of an aircraft assembled on the first story, and after one or more components have been attached to the main body on the second story, move, to a third story above the second story, the main body with the one or more components attached.

11 Claims, 24 Drawing Sheets

(56) References Cited

U.S. PATENT DOCUMENTS

| | | | |
|---|---|---|---|
| 12,365,485 B2 * | 7/2025 | Hardi | B64F 5/50 |
| 2006/0100782 A1 * | 5/2006 | Levi | G01C 5/06 |
| | | | 701/468 |
| 2009/0189736 A1 * | 7/2009 | Hayashi | G06F 21/32 |
| | | | 340/5.81 |
| 2010/0018043 A1 * | 1/2010 | Coalson | B21D 26/023 |
| | | | 29/791 |
| 2011/0209321 A1 * | 9/2011 | Kilibarda | G06Q 50/04 |
| | | | 29/700 |
| 2015/0343473 A1 * | 12/2015 | Mathis | B25J 5/04 |
| | | | 427/427.2 |
| 2017/0175413 A1 * | 6/2017 | Curlander | B64F 1/025 |
| 2021/0206513 A1 * | 7/2021 | Adamson | B64C 25/16 |
| 2022/0017222 A1 * | 1/2022 | Benner | B64U 80/25 |
| 2022/0153441 A1 | 5/2022 | Smith et al. | |
| 2024/0239516 A1 * | 7/2024 | Hardi | B64F 5/50 |

* cited by examiner

MANUFACTURING FACILITY AND METHOD

CROSS-REFERENCE TO RELATED APPLICATION

This application claims priority to Japanese Patent Application No. 2024-045453 filed on Mar. 21, 2024, the entire contents of which are incorporated herein by reference.

TECHNICAL FIELD

The present disclosure relates to a manufacturing facility and a method.

BACKGROUND

Patent Literature (PTL) 1 discloses an assembly line in an aircraft factory.

CITATION LIST

Patent Literature

PTL 1: JP 2022-081433 A

SUMMARY

Since the assembly of aircraft requires large space, location is one of problems for conventional aircraft factories.

It would be helpful to save space in assembly areas for aircraft.

A manufacturing facility according to the present disclosure is a multi-story manufacturing facility including a movement mechanism configured to:

move, to a second story above a first story, a main body of an aircraft assembled on the first story; and after one or more components have been attached to the main body on the second story, move, to a third story above the second story, the main body with the one or more components attached.

A method according to the present disclosure is a method of assembling an aircraft in a multi-story manufacturing facility, the method including:

assembling a main body of the aircraft on a first story;

moving the main body to a second story above the first story;

attaching one or more components to the main body on the second story; and moving, to a third story above the second story, the main body with the one or more components attached.

The present disclosure makes it possible to assemble aircraft without large areas of land.

BRIEF DESCRIPTION OF THE DRAWINGS

In the accompanying drawings:

FIG. 18 is a schematic cross-sectional view of the manufacturing facility, corresponding to S204 in FIG. 13;

FIG. 19 is a schematic cross-sectional view of the manufacturing facility, corresponding to S205 in FIG. 13;

FIG. 20 is a schematic cross-sectional view of the manufacturing facility, corresponding to S206 to S210 in FIG. 13;

DETAILED DESCRIPTION

Figure 1:
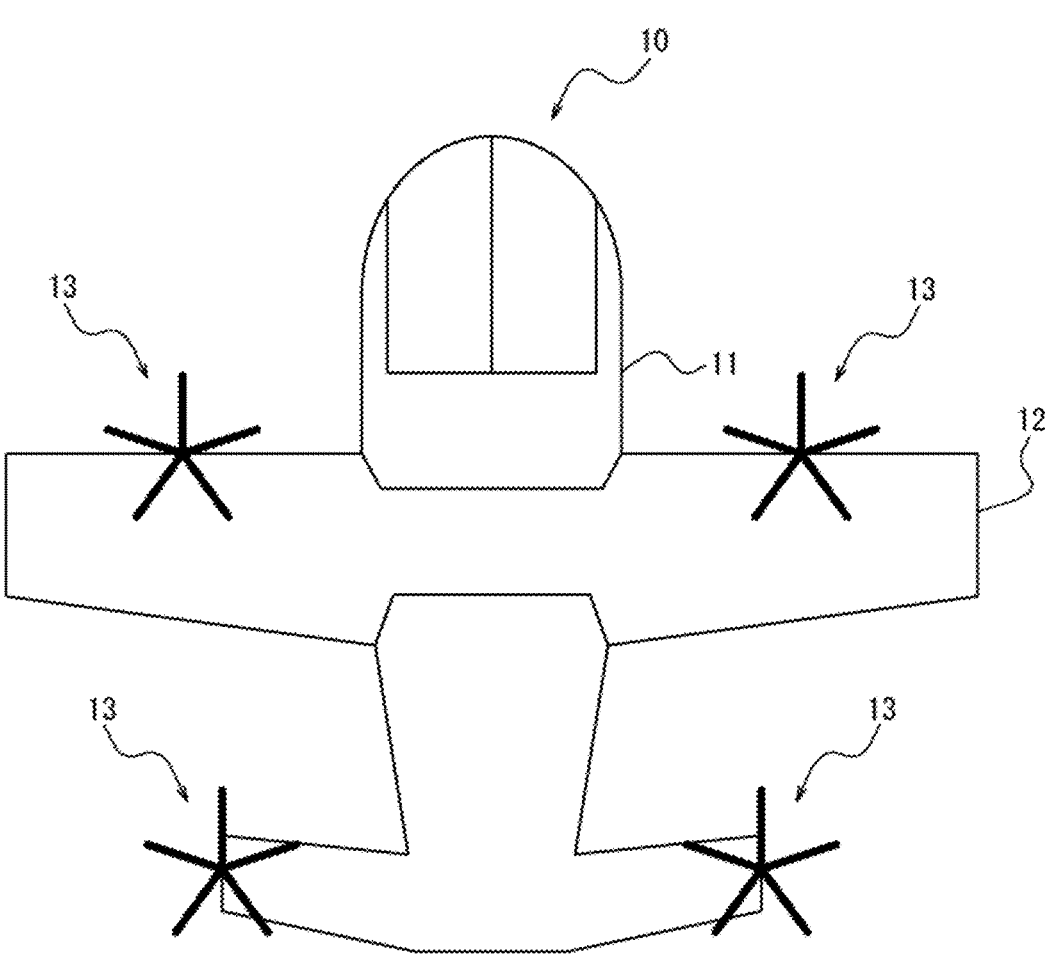
FIG. 1 is a schematic plan view of an aircraft according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of an aircraft 10 according to the present embodiment will be described with reference to FIG. 1.

In the present embodiment, the aircraft 10 is a vertical takeoff and landing aircraft that obtains lift and thrust by one or more electric rotors, the so-called eVTOL, but may be any other type of aircraft, such as an airplane, a helicopter, or a glider. The term "eVTOL" is an abbreviation of electric vertical take-off and landing. A cabin of the aircraft 10 can accommodate one or more occupants. The aircraft 10 is piloted at least partially by VFR. The term "VFR" is an abbreviation of visual flight rules. The aircraft 10 may be piloted by IFR. The term "IFR" is an abbreviation of instrument flight rules.

The aircraft 10 has a main body 11, a main wing 12, and one or more rotary wings 13. The main wing 12 is attached to the top of the main body 11. In addition to the main wing 12, various other components such as doors, seats, and wheels are attached to the main body 11. The main wing 12 and a tail wing, which is provided at the rear of the main body 11, each have one or more nacelles. To each nacelle, the rotary wing 13 is attached. Each nacelle contains a drive mechanism, including a motor, to drive the rotary wing 13. The rotary wing 13 corresponds to an electric rotor. The rotary wing 13 may be of a tilt type. The number of rotary wings 13 can be arbitrary as long as it is sufficient to obtain necessary thrust. In the present embodiment, there are four rotary wings 13 in total, two on the main wing 12 and two on the tail wing. The number of nacelles is the same as the number of rotary wings 13. The main wing 12 contains one or more batteries that supply power to the drive mechanisms. The one or more nacelles may also contain similar batteries. The aircraft 10, as with conventional aircraft, may be further provided with equipment such as avionics and actuators, electrical components such as wiring harnesses, and outfitting components such as air conditioning ducts and other piping. The avionics includes, for example, computers, flight recorders, and radar.

A manufacturing method according to the present embodiment, specifically, a method of assembling an aircraft 10 in a multi-story manufacturing facility 20 in a factory, according to the present embodiment, will be described with reference to FIGS. 2 to 10.

The manufacturing facility 20 includes a movement mechanism 30. The movement mechanism 30 has a vertically movable conveyor 31.

The manufacturing facility 20 includes a fixed floor 41 on a first story 21. The fixed floor 41 is a floor on which the conveyor 31 is provided. The manufacturing facility 20 includes a fixed floor 42 on a second story 22 above the first story 21. The fixed floor 42 is a floor with an opening 45. The manufacturing facility 20 includes a fixed floor 43 on a third story 23 above the second story 22. The fixed floor 43 is a floor with an opening 46. The manufacturing facility 20 includes a fixed floor 44 on a fourth story 24 above the third story 23. The fixed floor 44 is a floor with an opening 47. The manufacturing facility 20 may include, on a floor below the first story 21, i.e., a basement story 25, a warehouse that stores each component for the main body 11 of the aircraft 10, a line for manufacturing each component for the main body 11, or both. In the present embodiment, the fourth story 24 corresponds to a top story. A rooftop story 26 is above the fourth story 24. An opening 48 is formed in a roof 27 that separates between the fourth story 24 and the rooftop story 26. This opening 48 may be closable in order to prevent rain from entering the factory.

Figure 2:
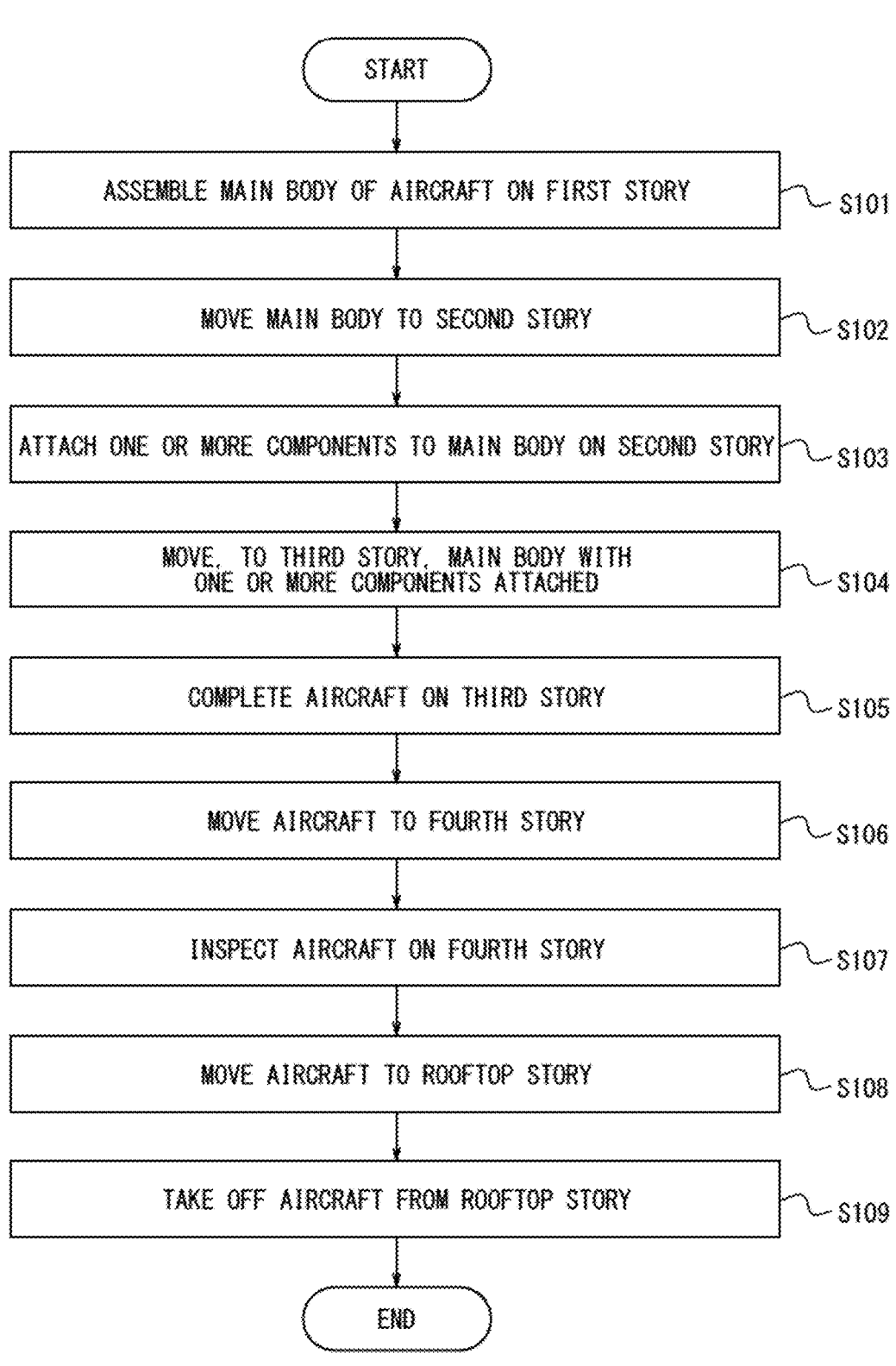
FIG. 2 is a flowchart illustrating a manufacturing method according to the embodiment of the present disclosure.

The manufacturing method according to the present embodiment includes steps S101 to S109 illustrated in FIG. 2.

Figure 3:
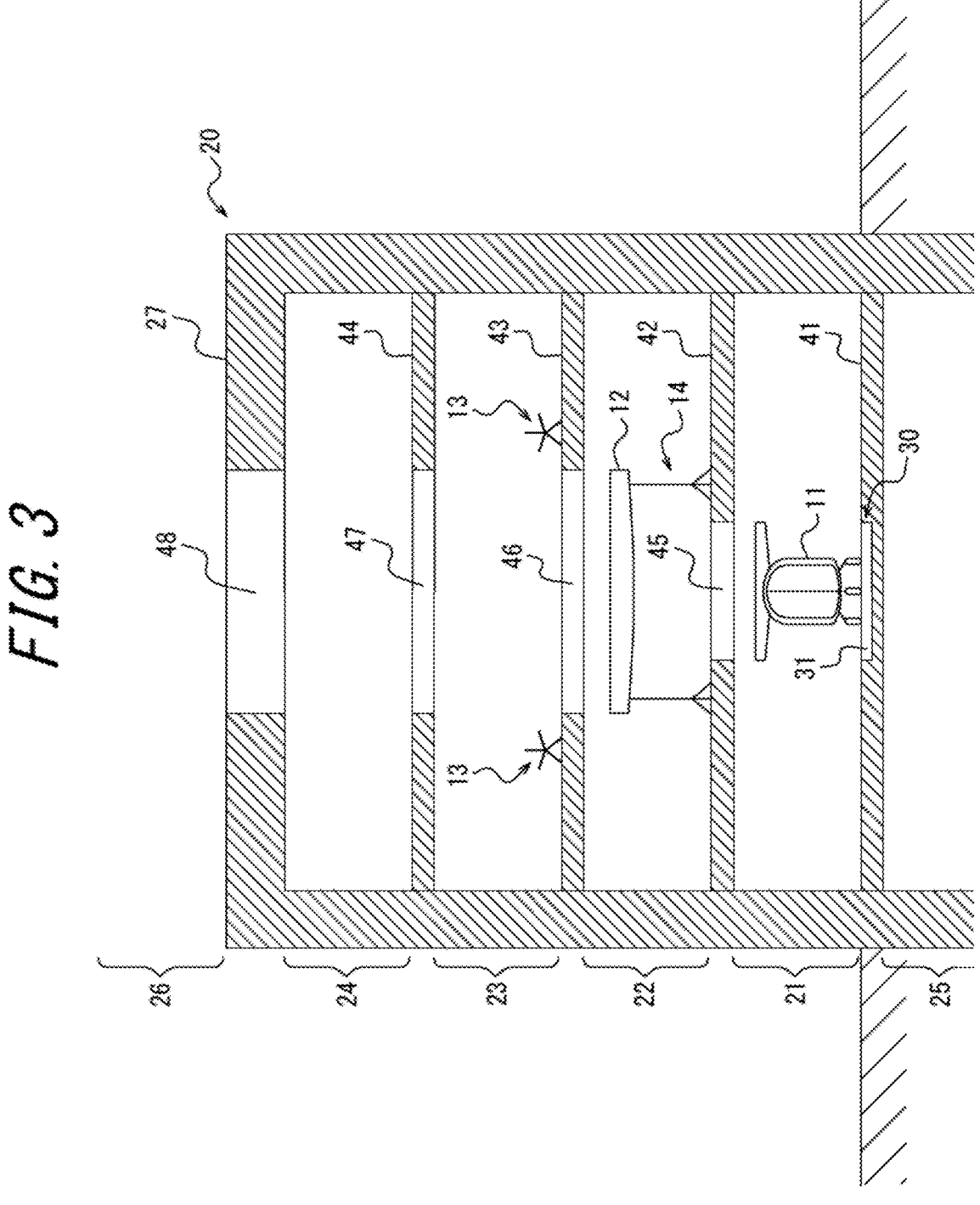
FIG. 3 is a schematic cross-sectional view of a manufacturing facility, corresponding to S101 in FIG. 2.

In S101, as illustrated in FIG. 3, a main body 11 of an aircraft 10 is assembled on the first story 21. Specifically, workers or robots, or workers and robots working together assemble the main body 11 on the first story 21. The assembled main body 11 is then placed on the conveyor 31 on the first story 21. The main body 11 may move by itself to the conveyor 31. While the main body 11 is being assembled, or after the main body 11 has been assembled, one or more components, including a main wing 12, are prepared on the second story 22. For example, the main wing 12 is supported by a jig 14 placed on the fixed floor 42, and disposed in a desired position. While the main body 11 is being assembled, or after the main body 11 has been assembled, the other components, including rotary wings 13, are prepared on the third story 23.

Figure 4:
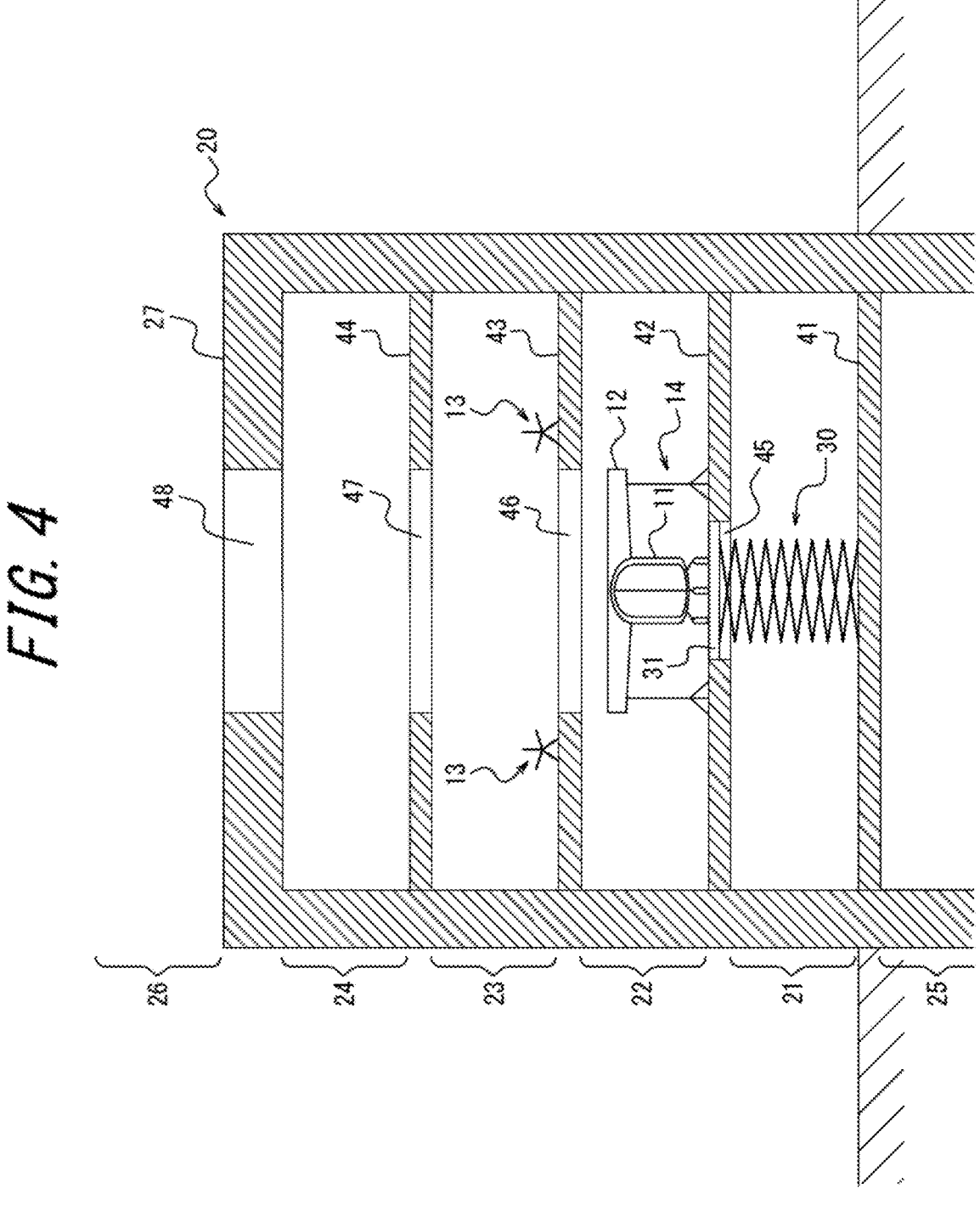
FIG. 4 is a schematic cross-sectional view of the manufacturing facility, corresponding to S102 in FIG. 2.

In S102, as illustrated in FIG. 4, the movement mechanism 30 moves the main body 11 to the second story 22. Specifically, the conveyor 31 moves upward through the opening 45 in the second story 22, while being loaded with the main body 11, so that the main body 11 is moved to the second story 22. In the present embodiment, the opening 45 in the second story 22 is shaped according to the shape of the main body 11. In some embodiments, the opening 45 in the second story 22 is a size just enough to allow the main body 11 to pass through, but may be slightly larger when a position at which the main body 11 is placed on the conveyor 31 is not conceivable to be constant.

Figure 5:
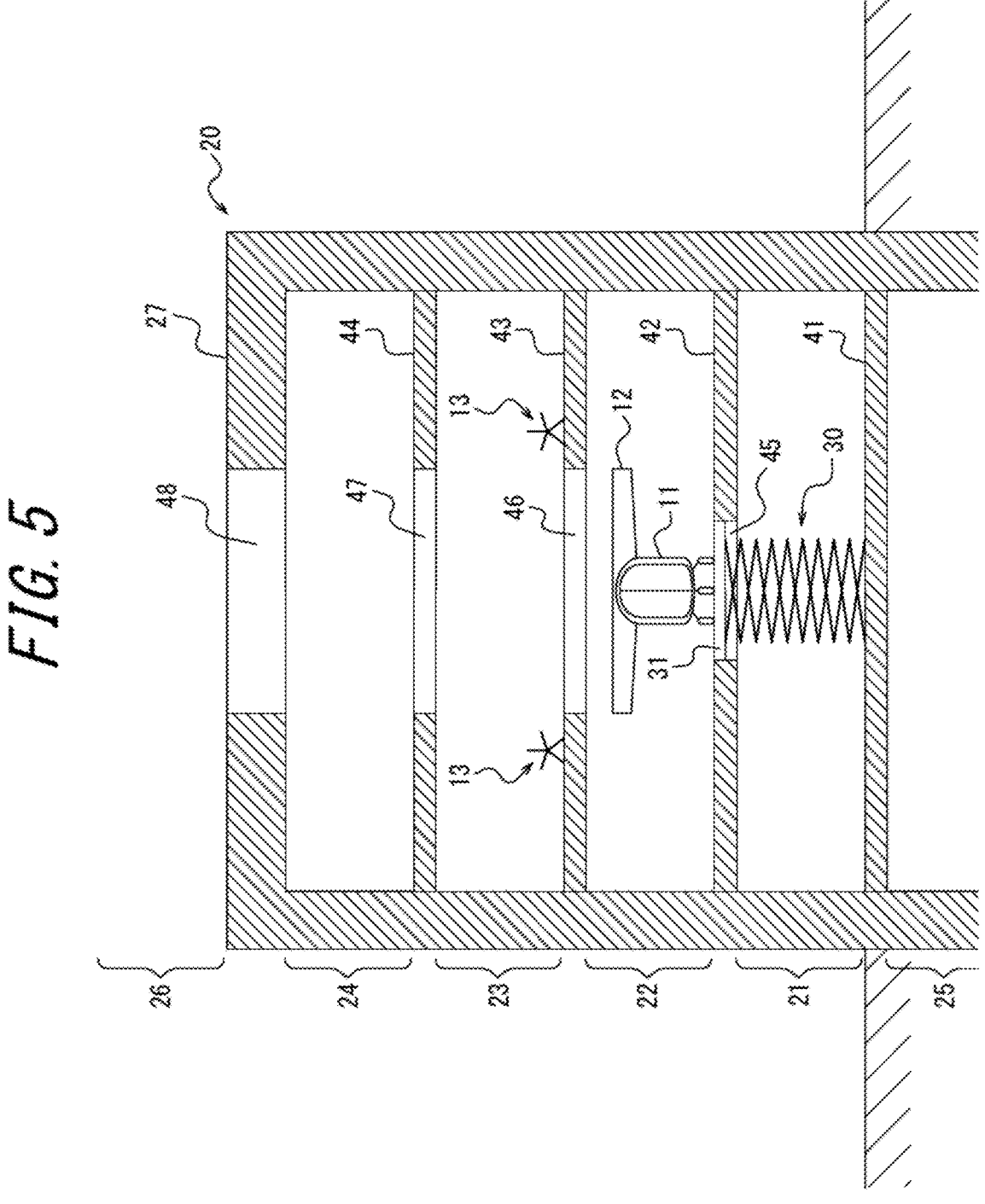
FIG. 5 is a schematic cross-sectional view of the manufacturing facility, corresponding to S103 in FIG. 2.

In S103, as illustrated in FIG. 5, the one or more components, including the main wing 12, are attached to the main body 11 on the second story 22. Specifically, workers or robots, or workers and robots working together attach the one or more components to the main body 11 on the second story 22. For example, the main wing 12 is joined with rivets to the top of the main body 11. In some embodiments, the main wing 12 is disposed in a joining position at the time of being prepared in S101, but may be lowered into the joining position by adjusting the height of the jig 14 in S103.

Figure 6:
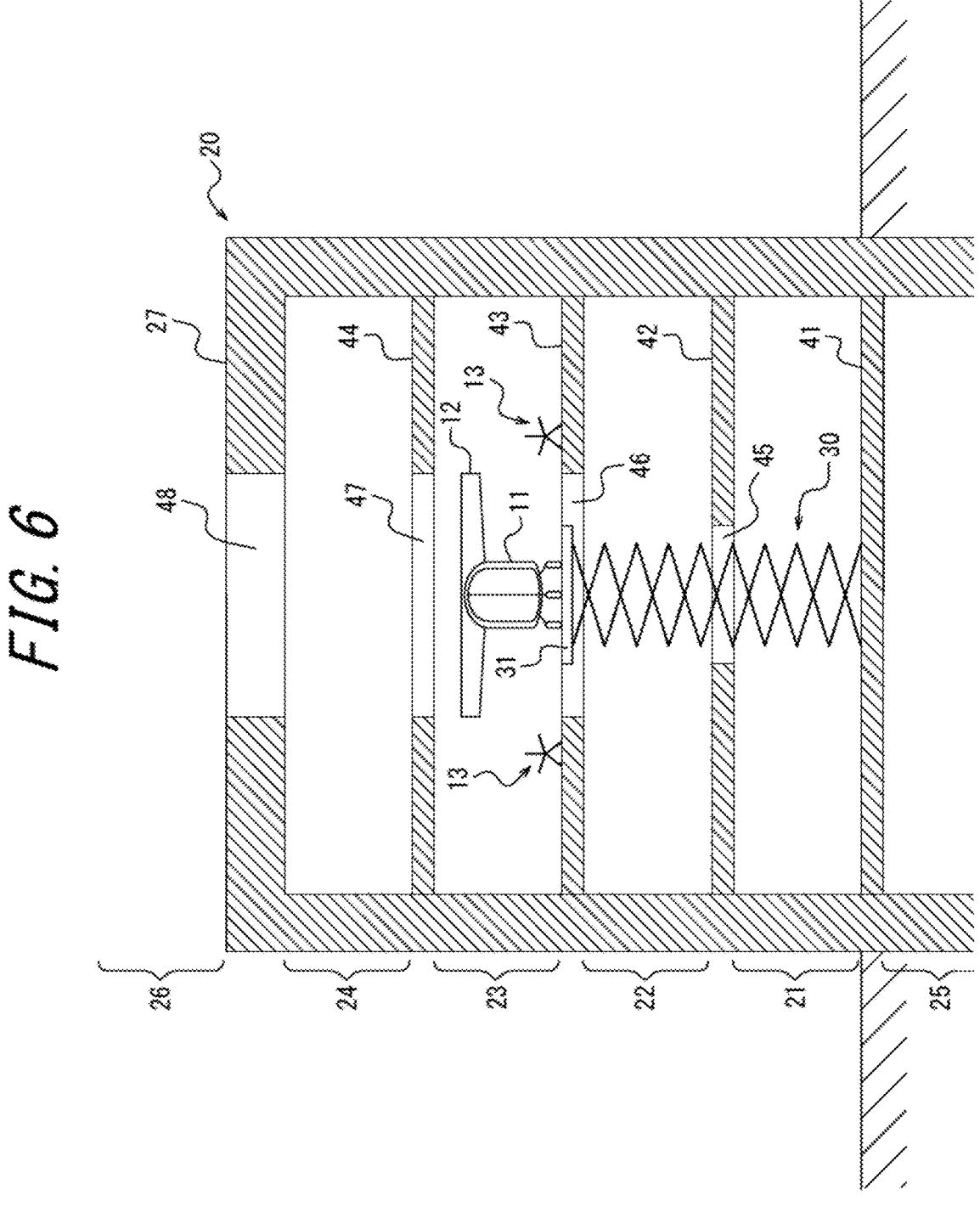
FIG. 6 is a schematic cross-sectional view of the manufacturing facility, corresponding to S104 in FIG. 2.

In S104, as illustrated in FIG. 6, the movement mechanism 30 moves, to the third story 23, the main body 11 with the one or more components, including the main wing 12, attached. Specifically, the conveyor 31 moves upward through the opening 46 in the third story 23, while being loaded with the main body 11 with the one or more components attached, so that the main body 11 with the one or more components attached is moved to the third story 23. In the present embodiment, the opening 46 in the third story 23 is larger than the opening 45 in the second story 22, and is shaped according to the shape of the main body 11 with the one or more components attached. In some embodiments, the opening 46 in the third story 23 is a size just enough to allow the main body 11, with the one or more components attached, to pass through, but may be slightly larger when a position at which the main body 11 with the one or more components attached is placed on the conveyor 31 is not conceivable to be constant.

Figure 7:
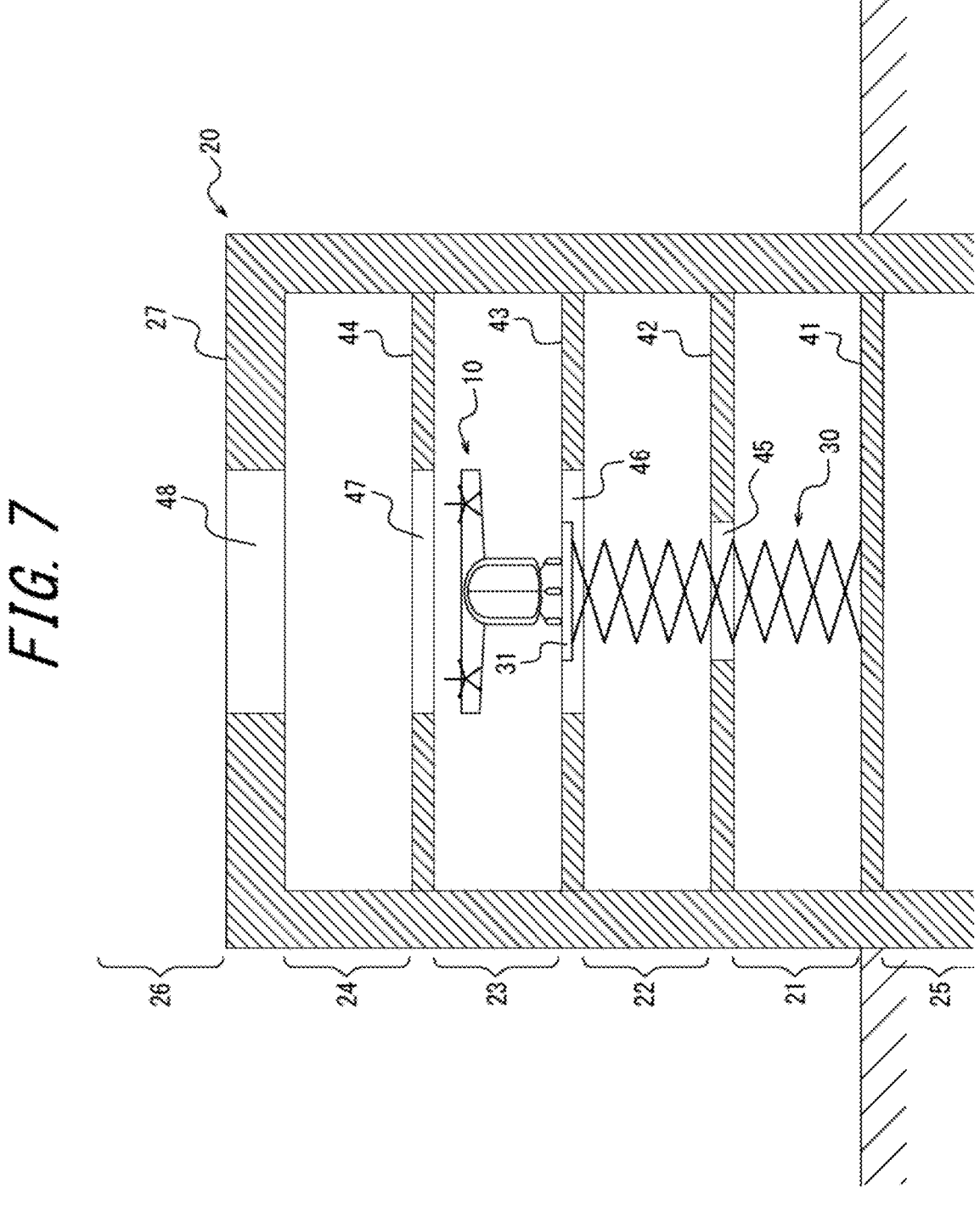
FIG. 7 is a schematic cross-sectional view of the manufacturing facility, corresponding to S105 in FIG. 2.

In S105, as illustrated in FIG. 7, on the third story 23, the other components, including the rotary wings 13, are attached to the main body 11 with the one or more components, including the main wing 12, attached, to complete the aircraft 10. Specifically, workers or robots, or workers and robots working together attach, on the third story 23, the other components to the main body 11 with the one or more components attached. For example, the rotary wings 13 are attached to nacelles of the main wing 12 and nacelles of a tail wing at the rear of the main body 11.

Figure 8:
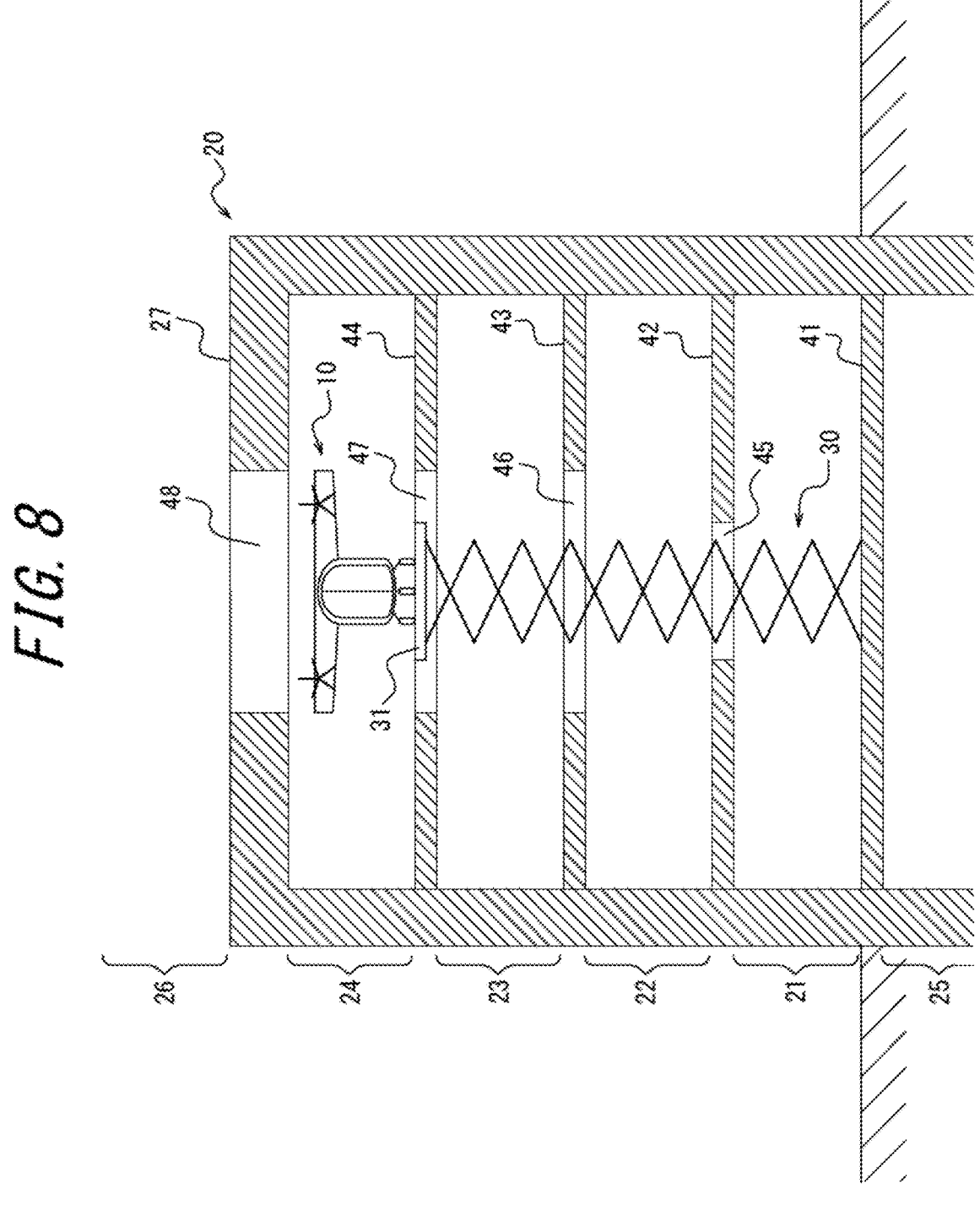
FIG. 8 is a schematic cross-sectional view of the manufacturing facility, corresponding to S106 in FIG. 2.

In S106, as illustrated in FIG. 8, the movement mechanism 30 moves the aircraft 10 to the fourth story 24. Specifically, the conveyor 31 moves upward through the opening 47 in the fourth story 24, while being loaded with the aircraft 10, so that the aircraft 10 is moved to the fourth story 24. In the present embodiment, the opening 47 in the fourth story 24 is larger than the opening 46 in the third story 23, and is shaped according to the shape of the aircraft 10. In some embodiments, the opening 47 in the fourth story 24 is a size just enough to allow the aircraft 10 to pass through, but may be slightly larger when a position at which the aircraft 10 is placed on the conveyor 31 is not conceivable to be constant.

In S107, the aircraft 10 is inspected on the fourth story 24. Specifically, workers or robots, or workers and robots working together inspect the aircraft 10 on the fourth story 24.

Figure 9:
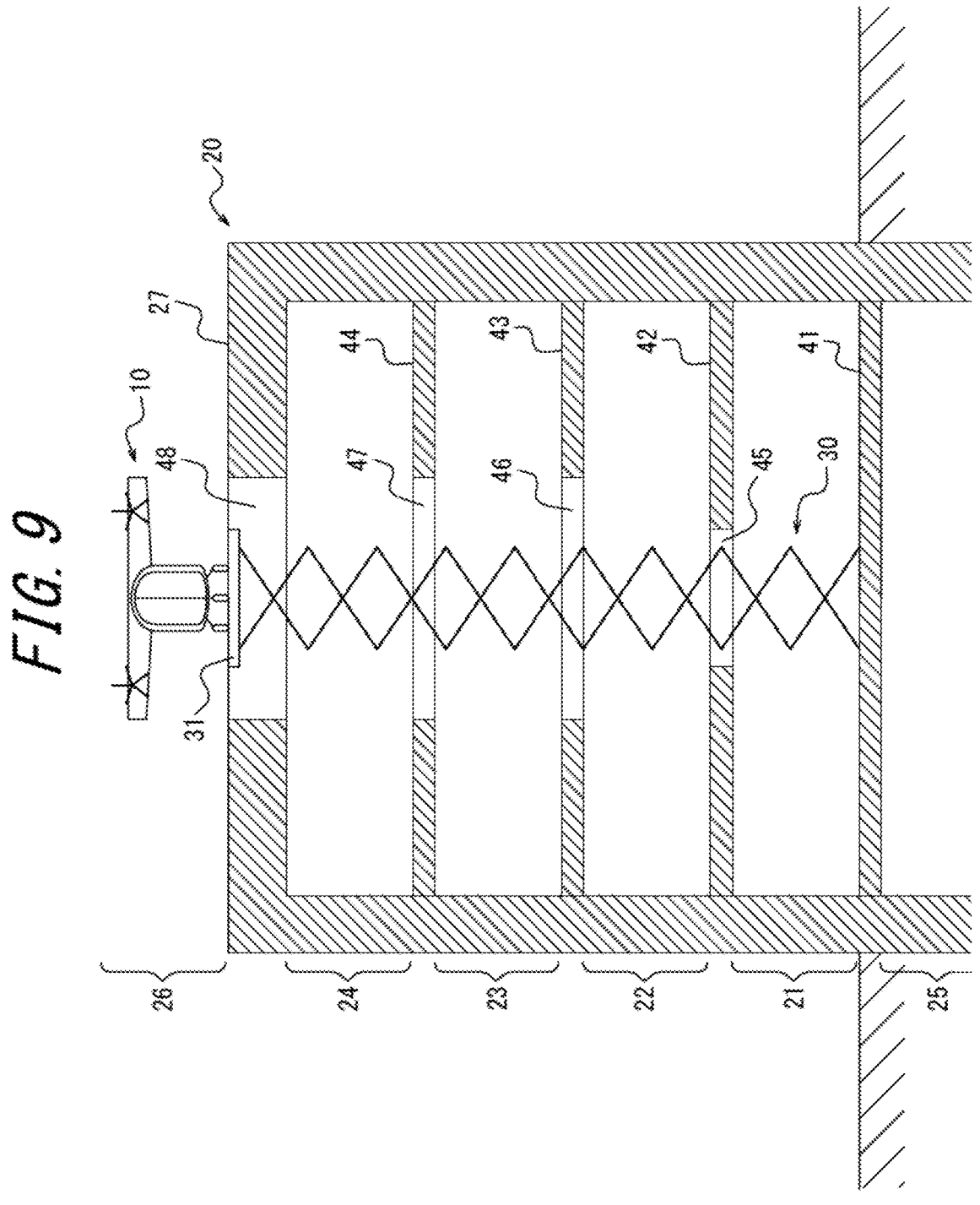
FIG. 9 is a schematic cross-sectional view of the manufacturing facility, corresponding to S108 in FIG. 2.

In S108, as illustrated in FIG. 9, the movement mechanism 30 moves the aircraft 10 to the rooftop story 26. Specifically, the conveyor 31 moves upward through the opening 48 in the roof 27, while being loaded with the aircraft 10, so that the aircraft 10 is moved to the rooftop story 26. Then, on the rooftop story 26, an occupant who pilots the aircraft 10 gets on board the aircraft 10. In the present embodiment, the opening 48 in the roof 27 is about the same size as the opening 47 in the fourth story 24, and is shaped according to the shape of the aircraft 10.

Figure 10:
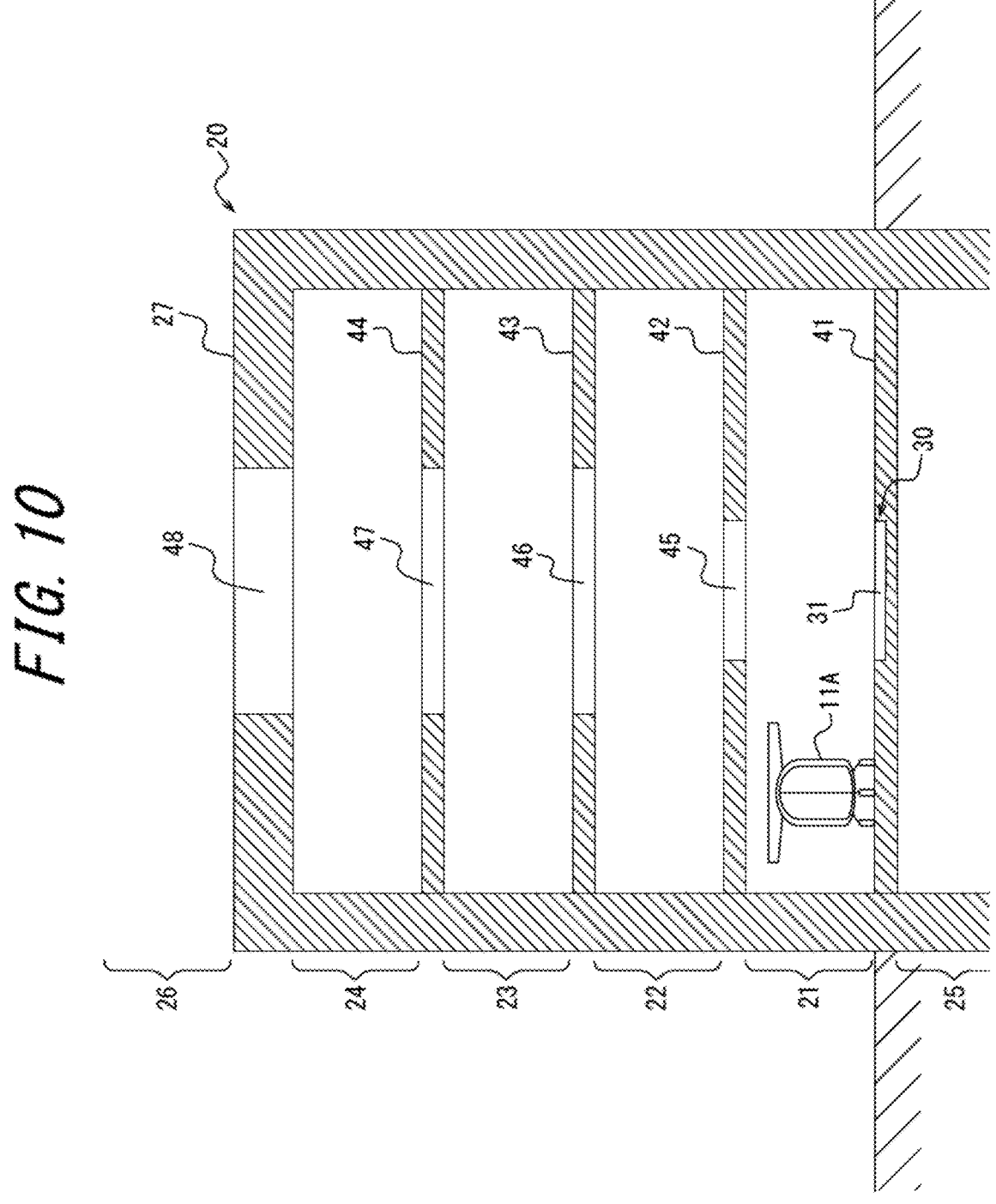
FIG. 10 is a schematic cross-sectional view of the manufacturing facility, corresponding to S109 in FIG. 2.

In S109, as illustrated in FIG. 10, the aircraft 10 takes off from the rooftop story 26. Specifically, the occupant pilots the aircraft 10 on the rooftop story 26 so that the aircraft 10 takes off vertically. The conveyor 31 then returns to an original position on the first story 21 by moving downward through the opening 48 in the roof 27, the opening 47 in the fourth story 24, the opening 46 in the third story 23, and the opening 45 in the second story 22. In the present embodiment, after the main body 11 has moved to the second story 22 in S102, in some embodiments, by the time the conveyor 31 returns to the original position in S109, a main body 11A of the next aircraft is assembled on the first story 21, as in step S101. The assembled main body 11A is then placed on the conveyor 31, which has returned to the original position, on the first story 21. Then, the same steps as in S102 to S109 are performed on the next aircraft.

Figure 11:
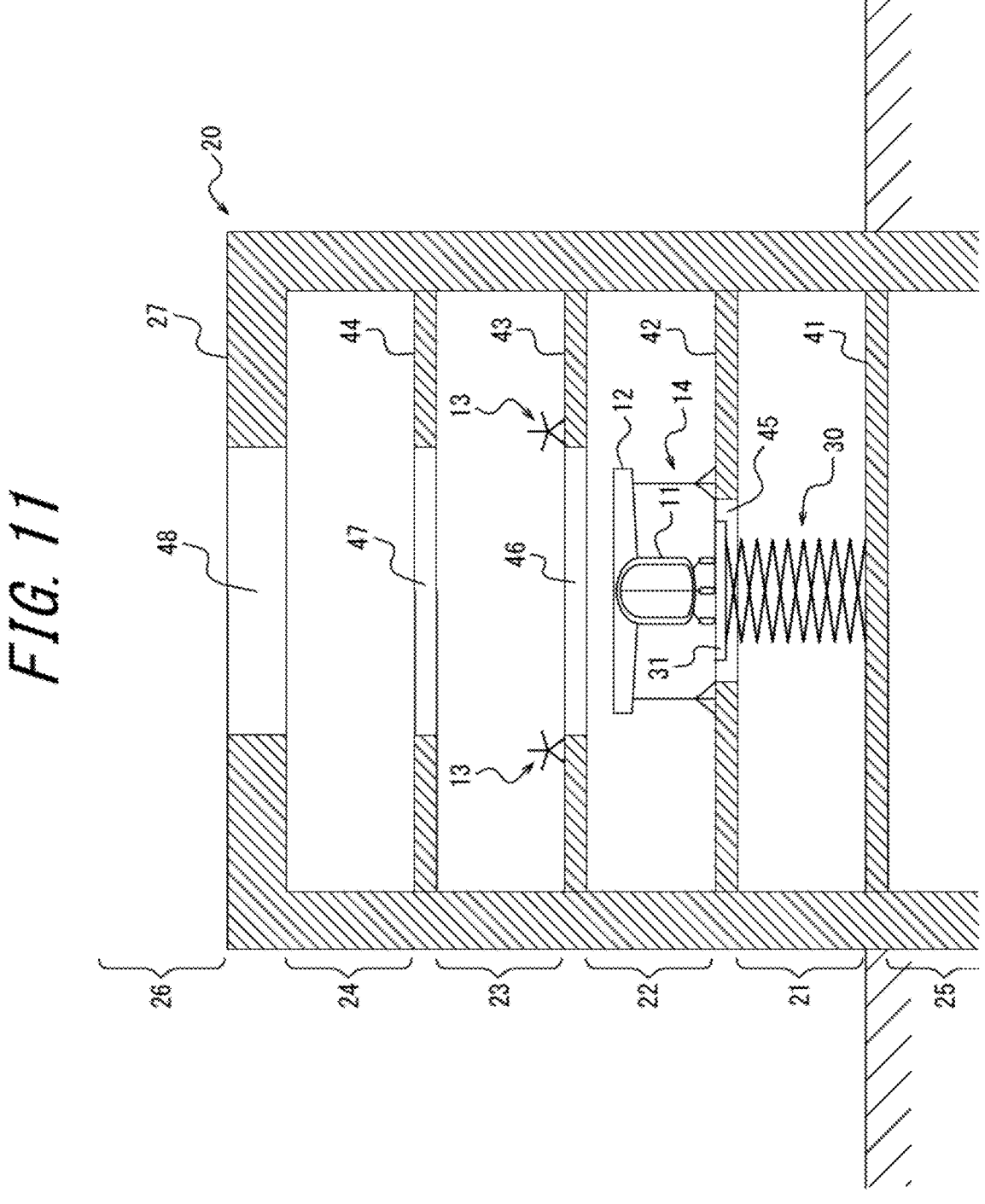
FIG. 11 is a schematic cross-sectional view of the manufacturing facility, corresponding to S102 in a variation.
Figure 12:
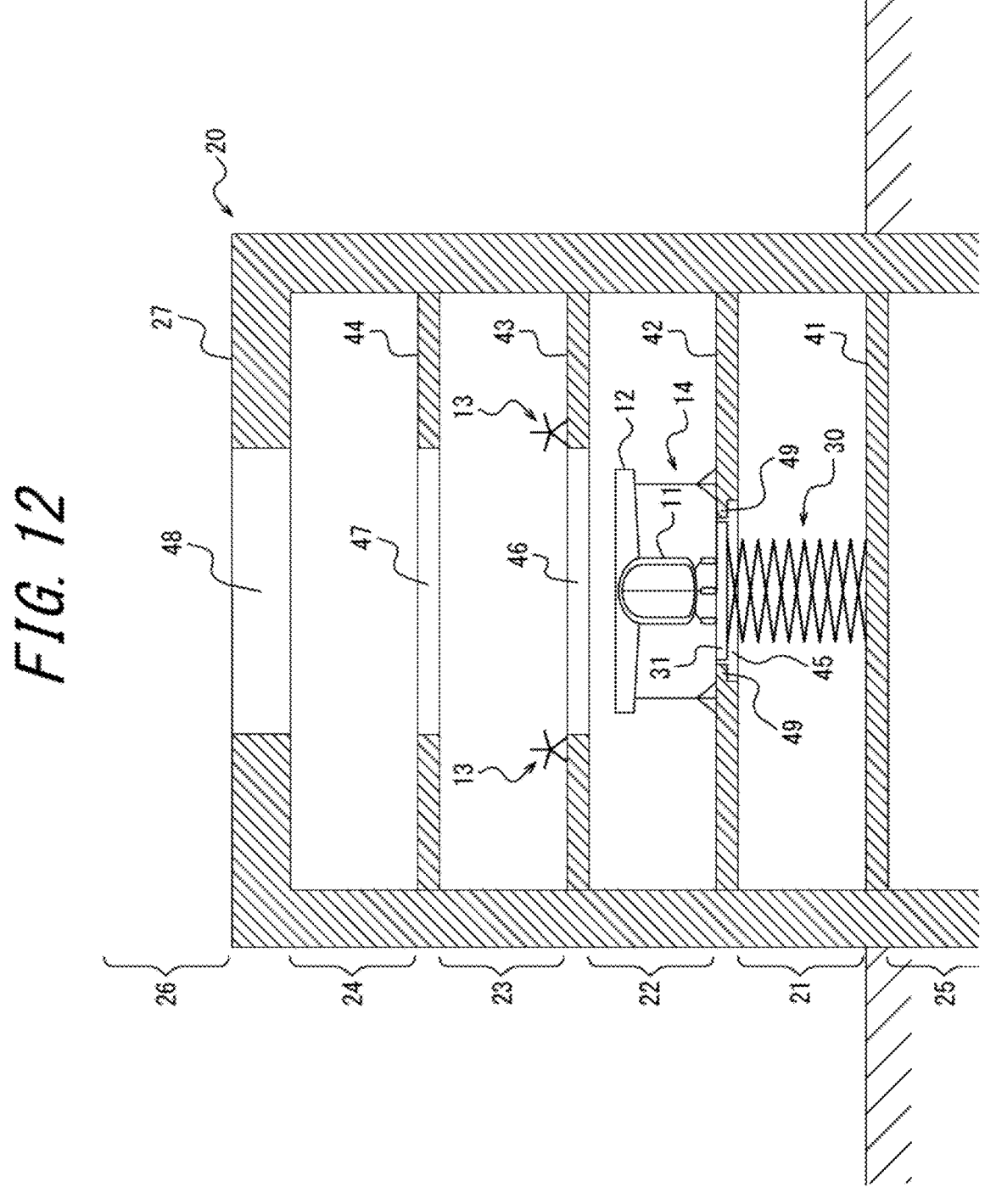
FIG. 12 is a schematic cross-sectional view of the manufacturing facility, corresponding to S102 in the variation.

When the opening 45 in the second story 22 is larger than the size that the main body 11 can just pass through, as illustrated in FIG. 11, a horizontally movable scaffold 49 for workers to attach the one or more components, including the main wing 12, to the main body 11 may be provided on the fixed floor 42, as illustrated in FIG. 12. In S102 in such a variation, as illustrated in FIG. 12, upon moving the main body 11 to the second story 22, the movement mechanism 30 moves the scaffold 49 closer to the main body 11 than a perimeter of the opening 45 in the second story 22. As a result, it is easier for the workers to perform tasks. A similar scaffold may be provided on the fixed floor 43. A similar scaffold may be provided on the fixed floor 44.

A manufacturing method according to a variation of the present embodiment, specifically, a method of assembling an aircraft 10 in a multi-story manufacturing facility 20 in a factory, according to this variation, will be described with reference to FIGS. 13 to 23.

In this variation, the movement mechanism 30 has vertically extendable bars 32, instead of the vertically movable conveyor 31. The number of bars 32 may be one, but is two or more in this variation.

In this variation, the manufacturing facility 20 includes a plurality of vertically movable floors including a first movable floor 81, instead of the plurality of fixed floors such as the fixed floor 41. The number of vertically movable floors may be any number of two or more, but is four in this variation. That is, the manufacturing facility 20 includes a second movable floor 82, a third movable floor 83, and a fourth movable floor 84, in addition to the first movable floor 81. Each vertically movable floor is configured with holes that close and allow the floor to catch the bars 32 only when the floor is pushed up by the bars 32. As another variation, the manufacturing facility 20 may include only the first movable floor 81. In other words, the number of vertically movable floors may be one.

The manufacturing facility 20 includes an assembly building 50, in which aircraft 10 are assembled, and a storage building 60, which is adjacent to the assembly building 50 and stores each component for the aircraft 10. At least one story of the assembly building 50 is connected to at least one story of the storage building 60. In this variation, a third story 53 of the assembly building 50, among a first story 51, second story 52, third story 53, and basement story 54 of the assembly building 50, is connected to a third story 63 of the storage building 60, among a first story 61, second story 62, third story 63, and basement story 64 of the storage building 60, via a passage 70. A rooftop story 65 is above the third story 63. In this variation, the third story 53 of the assembly building 50 corresponds to a top story. A rooftop story 55 is above the third story 53 of the assembly building 50. A roof 56 that separates between the third story 53 of the assembly building 50 and the rooftop story 55 may be retractable.

Figure 13:
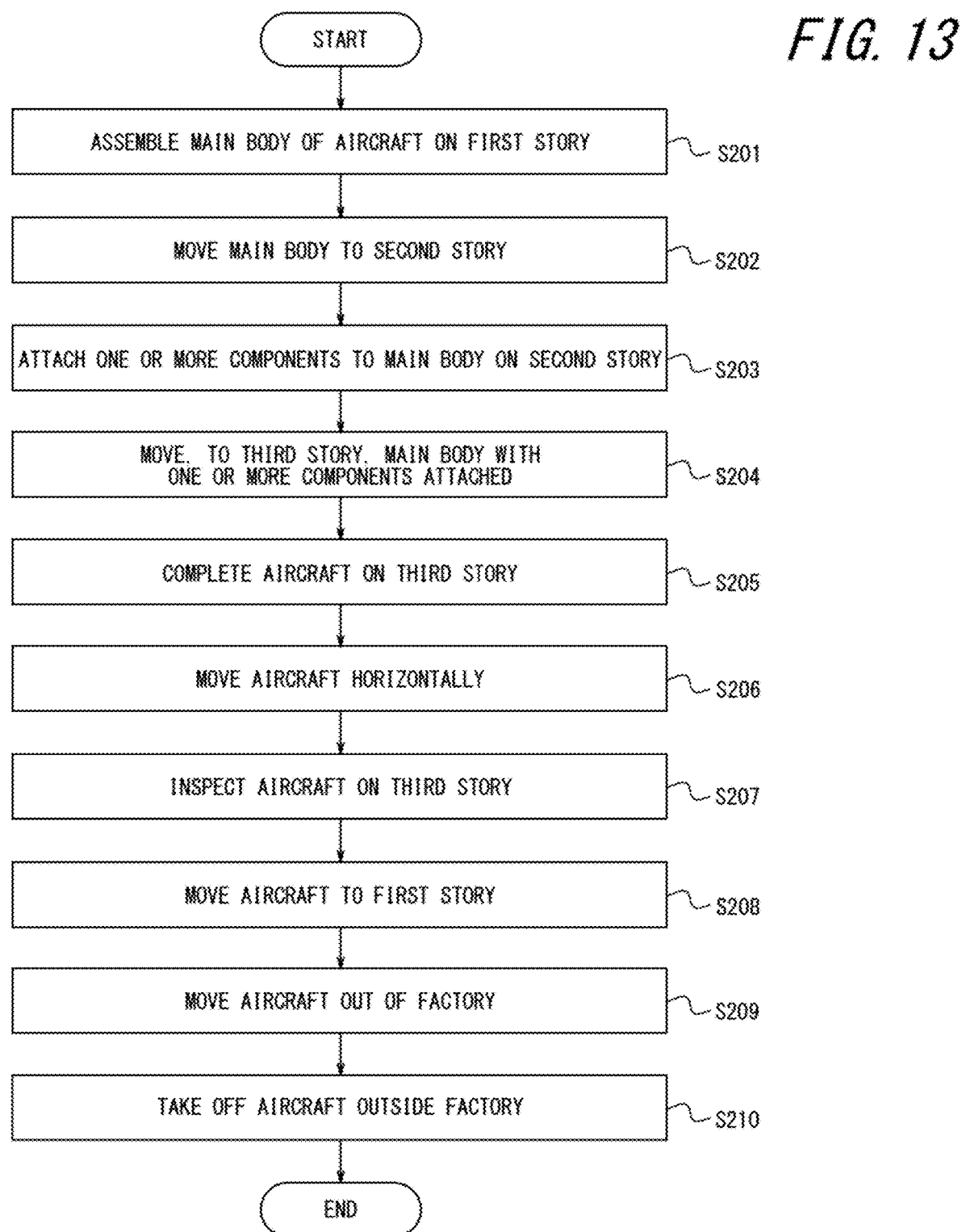
FIG. 13 is a flowchart illustrating a manufacturing method according to a variation of the embodiment of the present disclosure.

The manufacturing method according to this variation includes steps S201 to S210 illustrated in FIG. 13.

Figure 14:
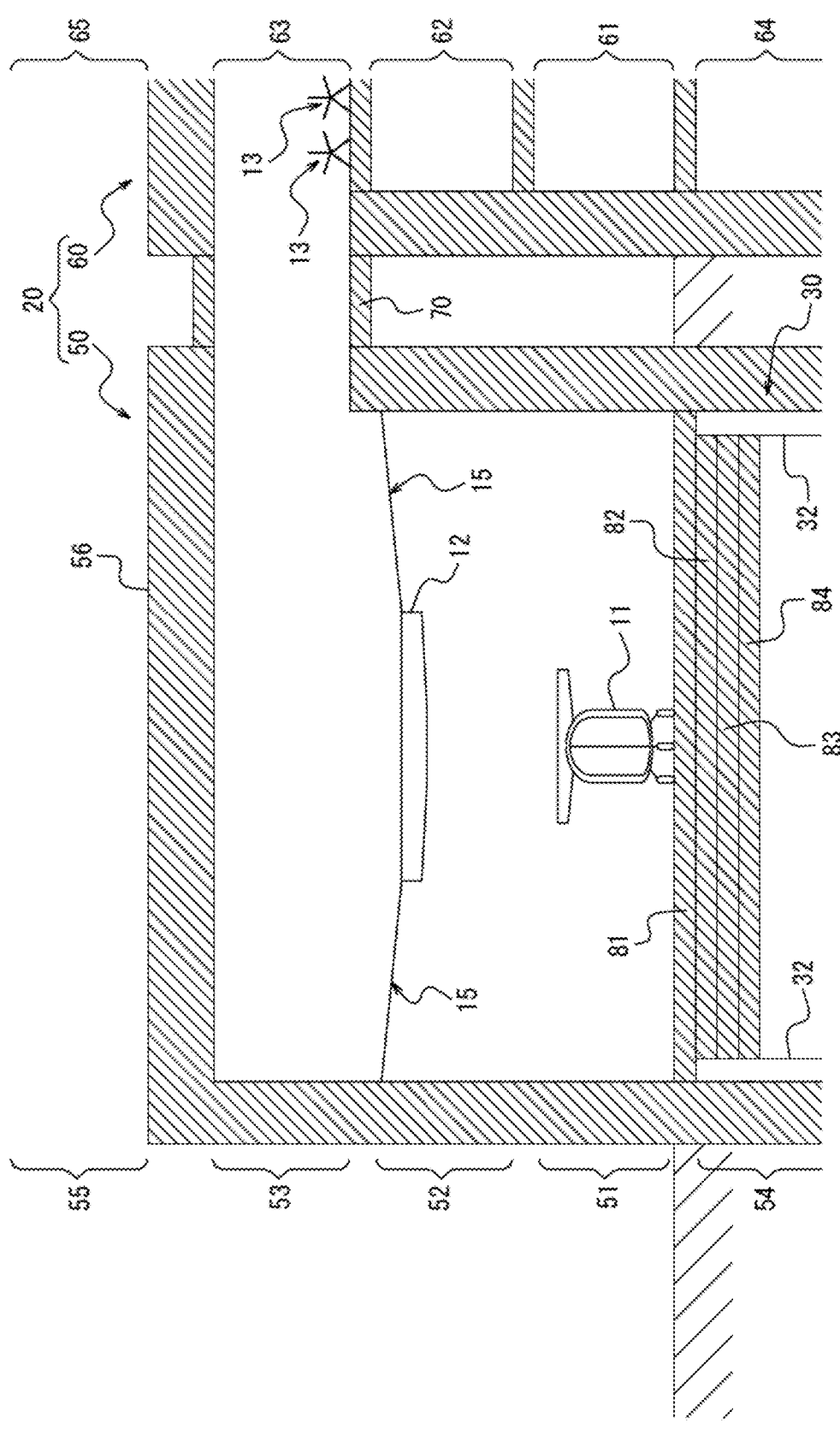
FIG. 14 is a schematic cross-sectional view of a manufacturing facility, corresponding to S201 in FIG. 13.

In S201, as illustrated in FIG. 14, a main body 11 of an aircraft 10 is assembled on the first story 51 of the assembly building 50. Specifically, workers or robots, or workers and robots working together assemble the main body 11 on the first movable floor 81 on the first story 51 of the assembly building 50. Therefore, on the first story 51 of the assembly building 50, the assembled main body 11 is placed on the first movable floor 81. While the main body 11 is being assembled, or after the main body 11 has been assembled, one or more components, including a main wing 12, are prepared on the second story 52 of the assembly building 50. For example, the main wing 12 is supported by a wire 15, and disposed in a desired position. While the main body 11 is being assembled, or after the main body 11 has been assembled, the other components, including rotary wings 13, are prepared on the third story 63 of the storage building 60.

Figure 15:
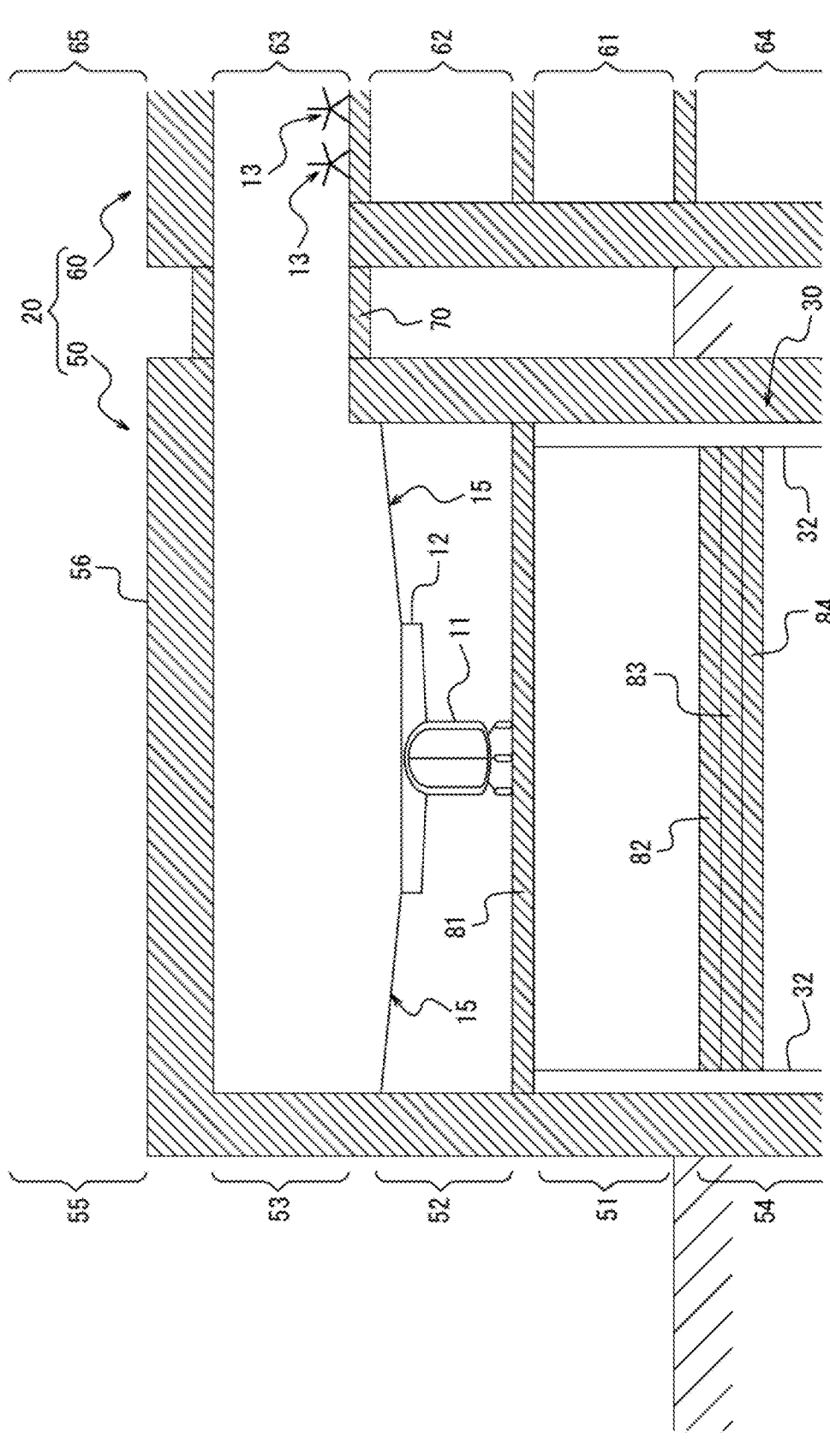
FIG. 15 is a schematic cross-sectional view of the manufacturing facility, corresponding to S202 in FIG. 13.

In S202, as illustrated in FIG. 15, the movement mechanism 30 moves the main body 11 to the second story 52 of the assembly building 50. Specifically, the bars 32 push up and move the first movable floor 81, thereby moving the main body 11, together with the first movable floor 81, to the second story 52 of the assembly building 50. At this point, the first movable floor 81 is above the second movable floor 82, the third movable floor 83, and the fourth movable floor 84. Therefore, the holes in the first movable floor 81 are closed, and the holes in the second movable floor 82, the third movable floor 83, and the fourth movable floor 84 are open, so that the bars 32 can penetrate the second movable floor 82, the third movable floor 83, and the fourth movable floor 84 and push up the first movable floor 81.

Figure 16:
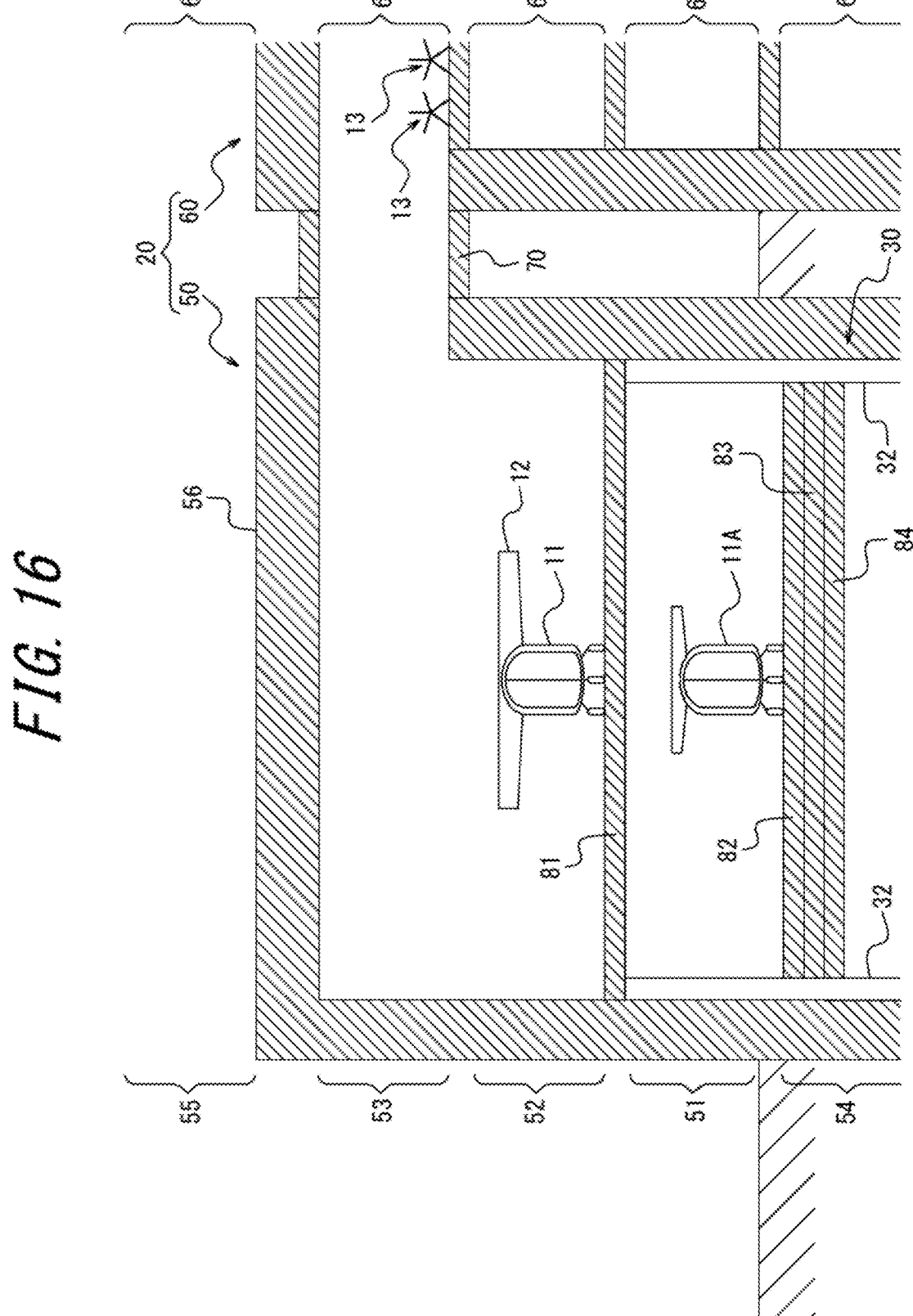
FIG. 16 is a schematic cross-sectional view of the manufacturing facility, corresponding to S203 in FIG. 13.

In S203, as illustrated in FIG. 16, the one or more components, including the main wing 12, are attached to the main body 11 on the second story 52 of the assembly building 50. Specifically, workers or robots, or workers and robots working together attach the one or more components to the main body 11 on the second story 52 of the assembly building 50. For example, the main wing 12 is joined with rivets to the top of the main body 11. In some embodiments, the main wing 12 is disposed in a joining position at the time of being prepared in S201, but may be lowered into the joining position by adjusting the length of the wire 15 in S203. In this variation, after the main body 11 has moved to the second story 52 of the assembly building 50 in S202, by the time the one or more components are attached to the main body 11 in S203 at the earliest, a main body 11A of an aircraft 10A is assembled on the first story 51 of the assembly building 50, as in step S201. Therefore, on the first story 51 of the assembly building 50, the assembled main body 11A is placed on the second movable floor 82.

Figure 17:
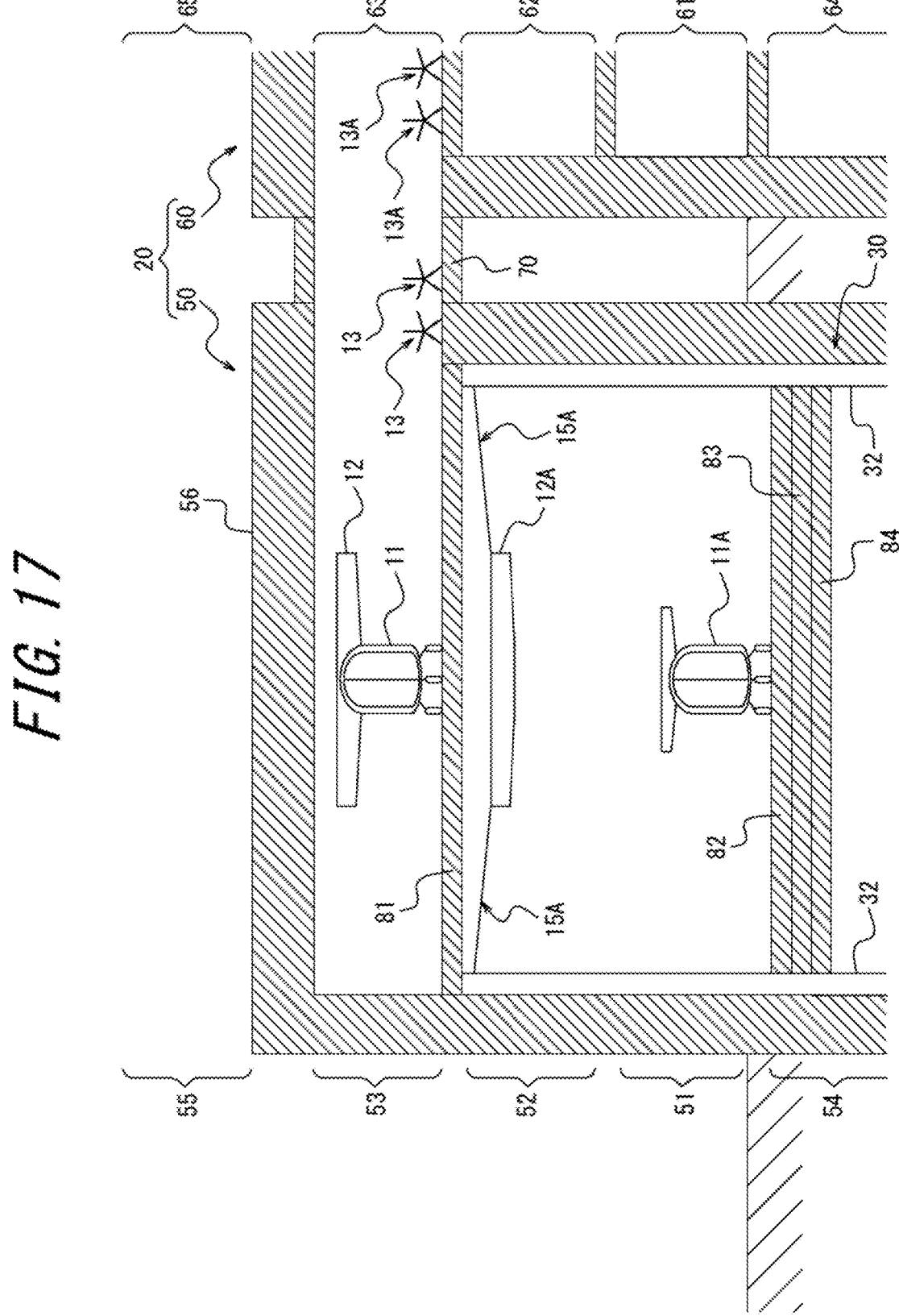
FIG. 17 is a schematic cross-sectional view of the manufacturing facility, corresponding to S204 in FIG. 13.
Figure 18:
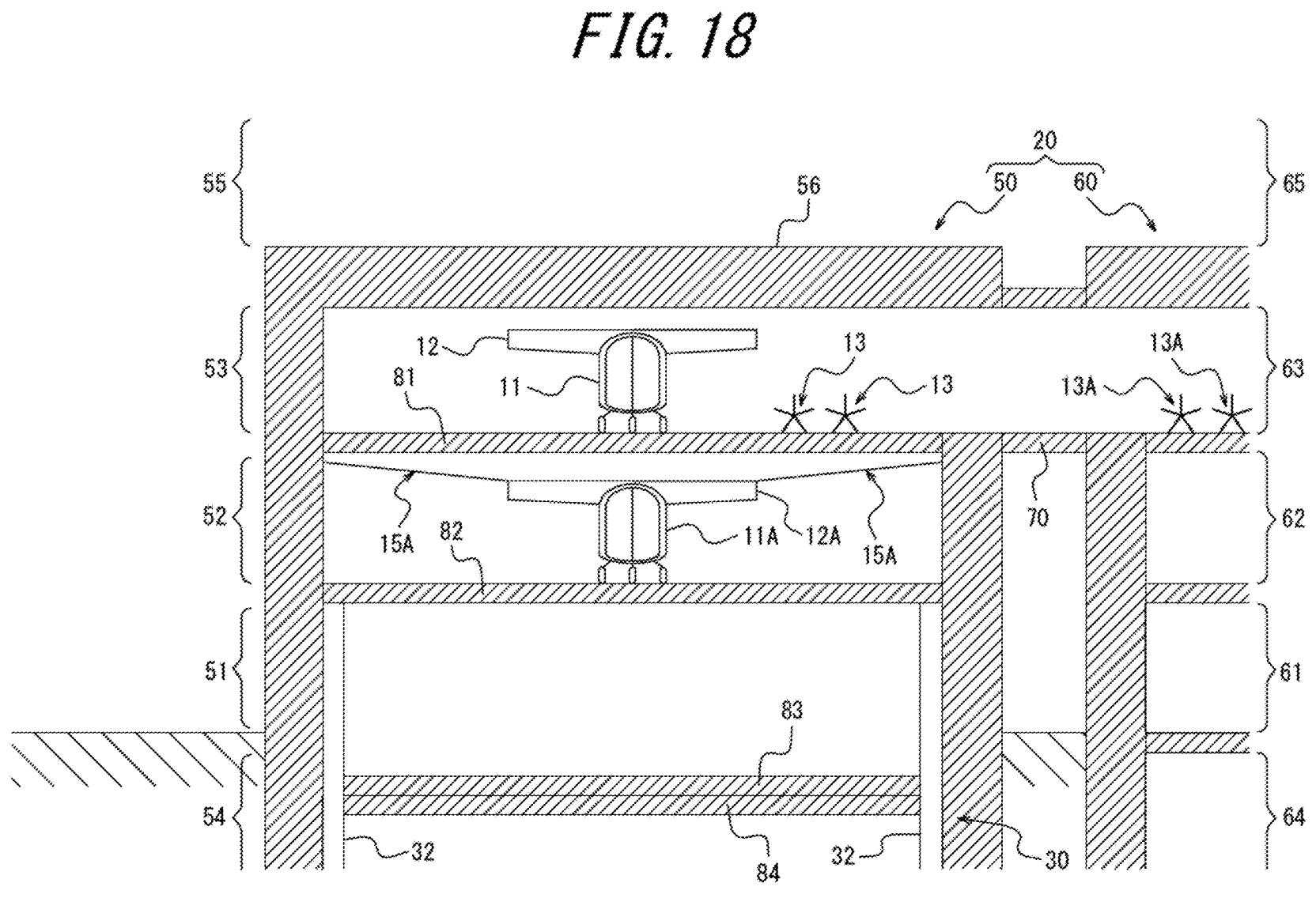

In S204, as illustrated in FIG. 17, the movement mechanism 30 moves, to the third story 53 of the assembly building 50, the main body 11 with the one or more components, including the main wing 12, attached. Specifically, the bars 32 push up and move the first movable floor 81, thereby moving, to the third story 53 of the assembly building 50, the main body 11 with the one or more components attached. At this point, the first movable floor 81 is still above the second movable floor 82, the third movable floor 83, and the fourth movable floor 84. Therefore, the holes in the first movable floor 81 are closed, and the holes in the second movable floor 82, the third movable floor 83, and the fourth movable floor 84 are open, so that the bars 32 can penetrate the second movable floor 82, the third movable floor 83, and the fourth movable floor 84 and push up the first movable floor 81. In this variation, after the main body 11 with the one or more components attached has moved to the third story 53 of the assembly building 50 in S204, one or more components, including a main wing 12A, are prepared on the second story 52 of the assembly building 50. For example, the main wing 12A is supported by a wire 15A, and disposed in a desired position. Then, as illustrated in FIG. 18, the movement mechanism 30 moves the main body 11A to the second story 52 of the assembly building 50. Specifically, the bars 32 push up and move the second movable floor 82, thereby moving the main body 11A, together with the second movable floor 82, to the second story 52 of the assembly building 50. At this point, the second movable floor 82 is above the third movable floor 83 and the fourth movable floor 84. Therefore, the holes in the second movable floor 82 are closed, and the holes in the third movable floor 83 and the fourth movable floor 84 are open, so that the bars 32 can penetrate the third movable floor 83 and the fourth movable floor 84 and push up the second movable floor 82. While the main body 11 with the one or more components attached is moving, or after the main body 11 with the one or more components attached has moved, the other components, including the rotary wings 13, are transported from the third story 63 of the storage building 60 via the passage 70 to the third story 53 of the assembly building 50. On the third story 63 of the storage building 60, the other components, including rotary wings 13A, are prepared.

Figure 19:
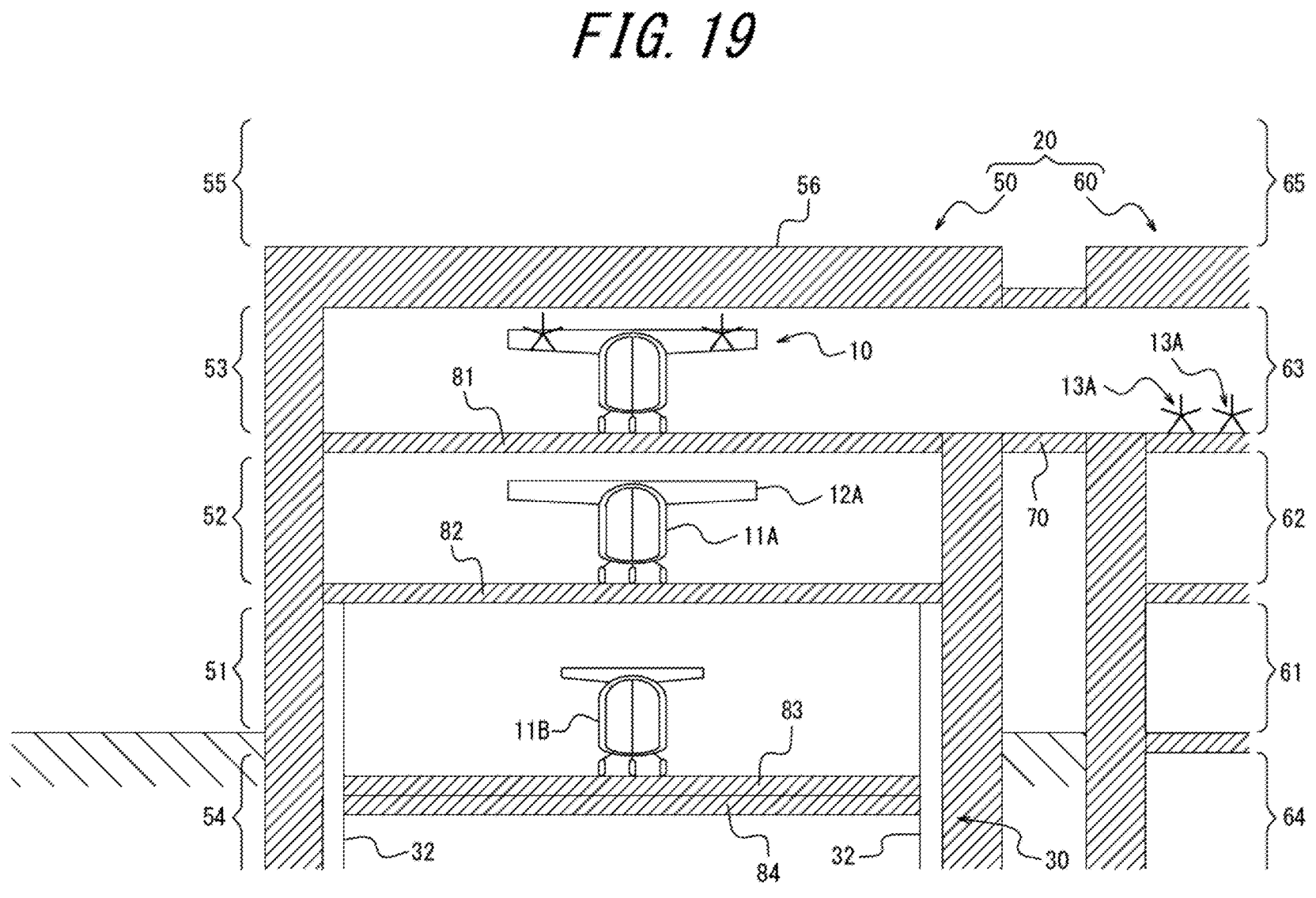

In S205, as illustrated in FIG. 19, on the third story 53 of the assembly building 50, the other components, including the rotary wings 13, are attached to the main body 11 with the one or more components, including the main wing 12, attached, to complete the aircraft 10. Specifically, workers or robots, or workers and robots working together attach, on the third story 53 of the assembly building 50, the other components to the main body 11 with the one or more components attached. For example, the rotary wings 13 are attached to nacelles of the main wing 12 and nacelles of a tail wing at the rear of the main body 11. In this variation, after the main body 11A has moved to the second story 52 of the assembly building 50, by the time the aircraft 10 is completed in S205 at the earliest, the one or more components, including the main wing 12A, are attached to the main body 11A on the second story 52 of the assembly building 50, as in step S203. In this variation, after the main body 11A has moved to the second story 52 of the assembly building 50, by the time the one or more components are attached to the main body 11A at the earliest, a main body 11B of the next aircraft is assembled on the first story 51 of the assembly building 50, as in step S201. Therefore, on the first story 51 of the assembly building 50, the assembled main body 11B is placed on the third movable floor 83.

Figure 20:
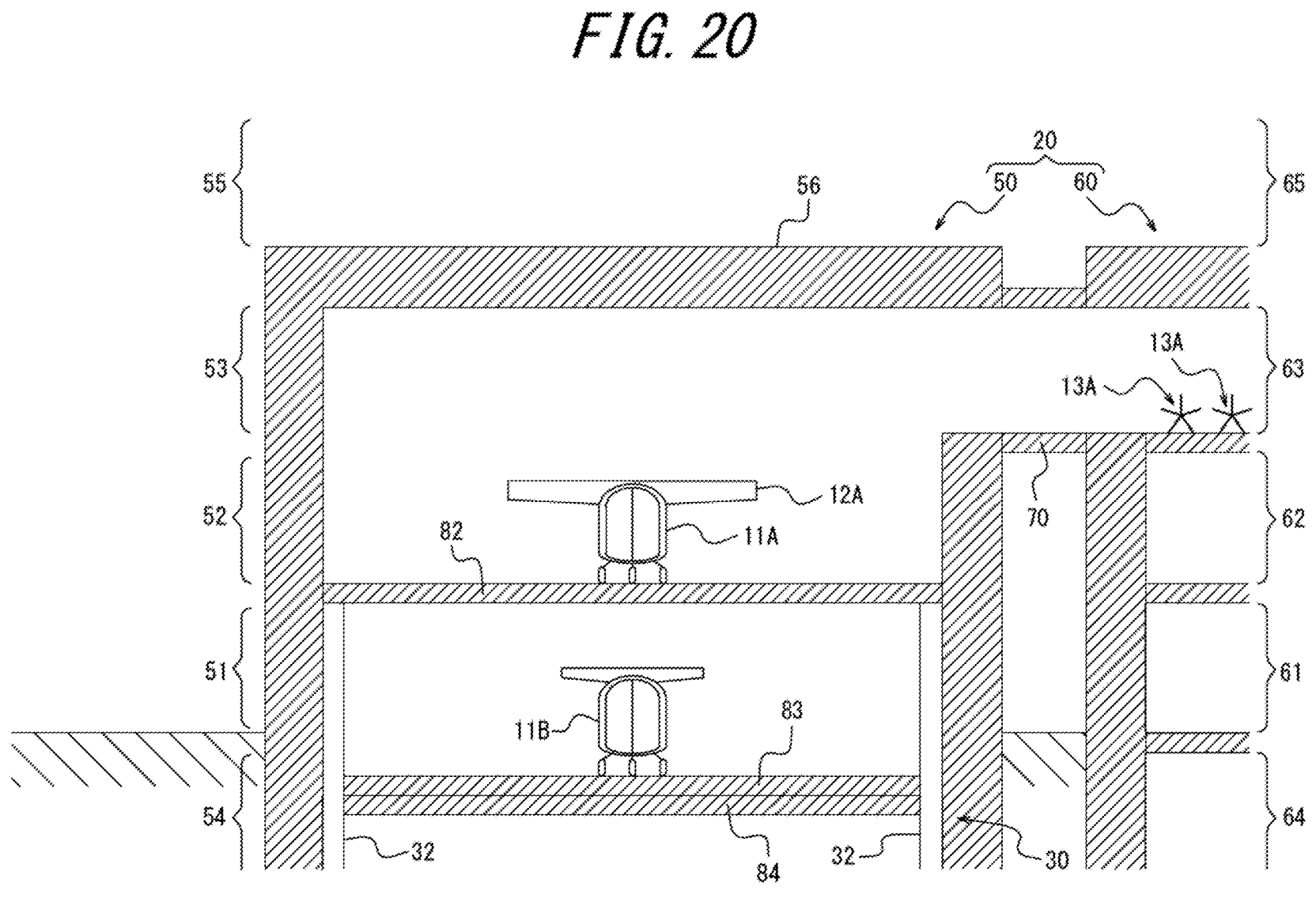

In S206, as illustrated in FIG. 20, the movement mechanism 30 moves the aircraft 10 horizontally. Specifically, the movement mechanism 30 moves the aircraft 10 horizontally by sliding the aircraft 10, together with the first movable floor 81, to the front side of FIG. 20, in a mechanism similar to a mechanical multi-level parking garage.

In S207, the aircraft 10 is inspected on the third story 53 of the assembly building 50. Specifically, workers or robots, or workers and robots working together inspect the aircraft 10 on the third story 53 of the assembly building 50.

In S208, the movement mechanism 30 moves the aircraft 10 to the first story 51 of the assembly building 50. Specifically, the movement mechanism 30 moves the aircraft 10 to the first story 51 of the assembly building 50, by moving the aircraft 10, together with the first movable floor 81, downward, in a mechanism similar to a mechanical multi-level parking garage. Then, on the first story 51 of the assembly building 50, an occupant who pilots the aircraft 10 gets on board the aircraft 10.

In S209, the aircraft 10 is moved out of the factory. Specifically, a tow truck tows the aircraft 10 on the first story 51 of the assembly building 50, to move the aircraft 10 out of the factory. Alternatively, the occupant may pilot the aircraft 10 on the first story 51 of the assembly building 50, to move the aircraft 10 out of the factory.

Figure 21:
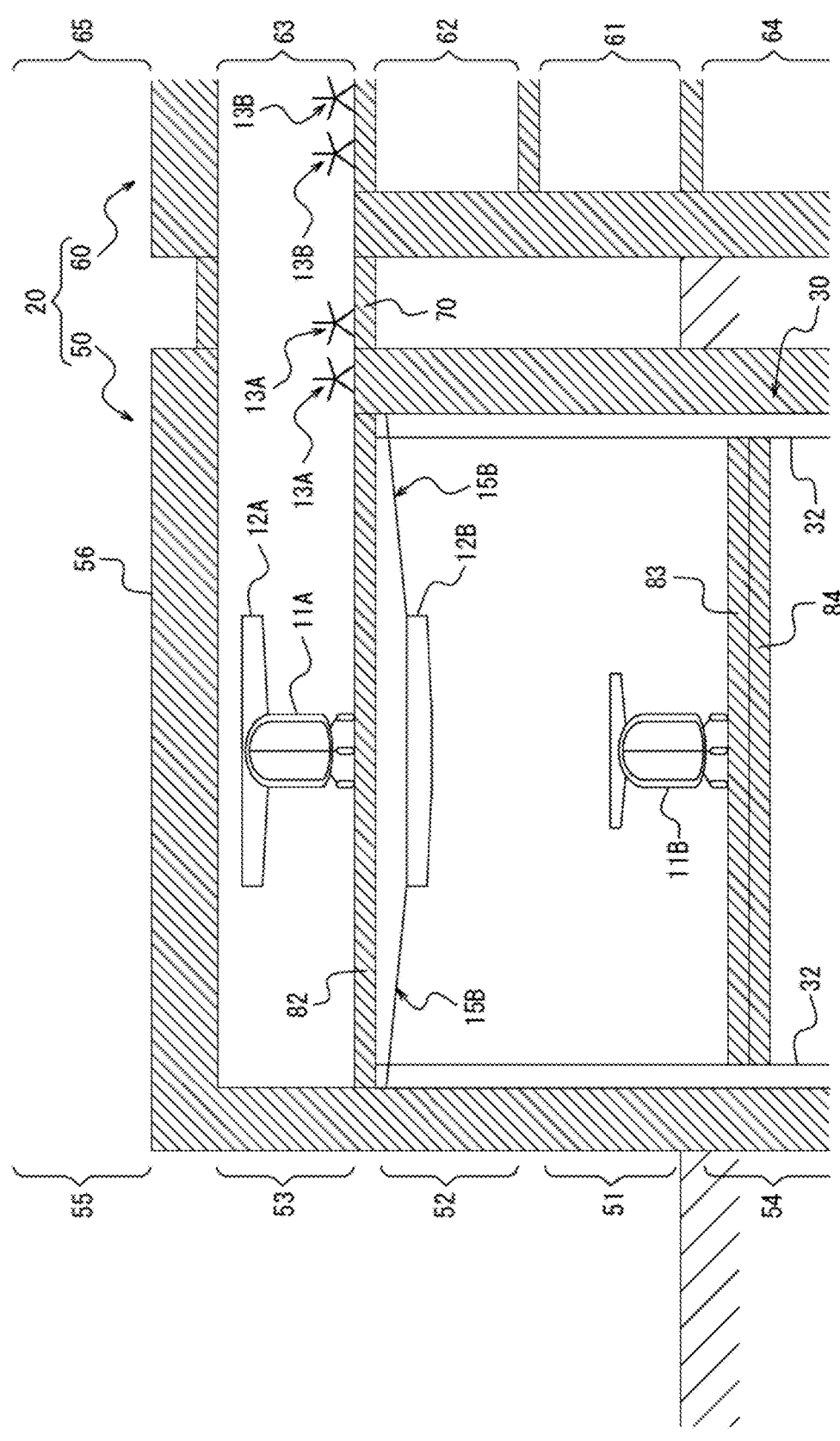
FIG. 21 is a schematic cross-sectional view of the manufacturing facility, corresponding to S206 to S210 in FIG. 13.
Figure 22:
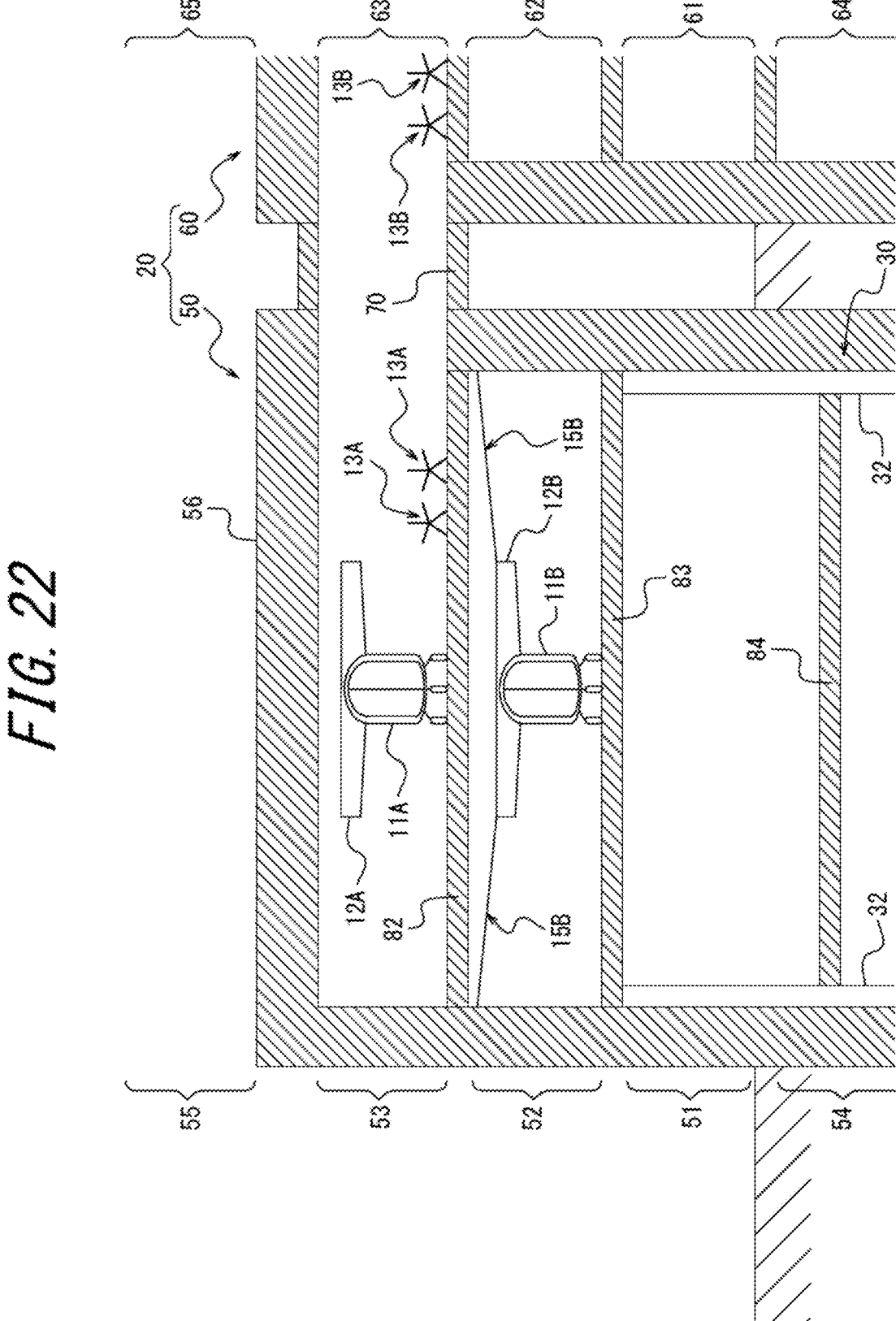
FIG. 22 is a schematic cross-sectional view of the manufacturing facility, corresponding to S206 to S210 in FIG. 13.
Figure 23:
FIG. 23 is a schematic cross-sectional view of the manufacturing facility, corresponding to S206 to S210 in FIG. 13.

In S210, the aircraft 10 takes off outside the factory. Specifically, the occupant pilots the aircraft 10 outside the factory, so that the aircraft 10 takes off vertically. The movement mechanism 30 then slides the first movable floor 81 back to an original position on the first story 51 of the assembly building 50, by sliding the first movable floor 81 to the opposite side from that in S206, in a mechanism similar to a mechanical multi-level parking garage. In this variation, after the aircraft 10 has moved horizontally in S206, as illustrated in FIG. 21, the movement mechanism 30 moves, to the third story 53 of the assembly building 50, the main body 11A with the one or more components, including the main wing 12A, attached. Specifically, the bars 32 push up and move the second movable floor 82, thereby moving the main body 11A with the one or more components attached, together with the second movable floor 82, to the third story 53 of the assembly building 50. At this point, the second movable floor 82 is still above the third movable floor 83 and the fourth movable floor 84. Therefore, the holes in the second movable floor 82 are closed, and the holes in the third movable floor 83 and the fourth movable floor 84 are open, so that the bars 32 can penetrate the third movable floor 83 and the fourth movable floor 84 and push up the second movable floor 82. In this variation, after the main body 11A with the one or more components attached has moved to the third story 53 of the assembly building 50, one or more components, including a main wing 12B, are prepared on the second story 52 of the assembly building 50. For example, the main wing 12B is supported by a wire 15B, and disposed in a desired position. Then, as illustrated in FIG. 22, the movement mechanism 30 moves the main body 11B to the second story 52 of the assembly building 50. Specifically, the bars 32 push up and move the third movable floor 83, thereby moving the main body 11B, together with the third movable floor 83, to the second story 52 of the assembly building 50. At this point, the third movable floor 83 is above the fourth movable floor 84. Therefore, the holes in the third movable floor 83 are closed, and the holes in the fourth movable floor 84 are open, so that the bars 32 can penetrate the fourth movable floor 84 and push up the third movable floor 83. While the main body 11A with the one or more components attached is moving, or after the main body 11A with the one or more components attached has moved, the other components, including the rotary wings 13A, are transported from the third story 63 of the storage building 60 via the passage 70 to the third story 53 of the assembly building 50. On the third story 63 of the storage building 60, the other components, including rotary wings 13B, are prepared. Then, as in S205, as illustrated in FIG. 23, on the third story 53 of the assembly building 50, the other components, including the rotary wings 13A, are attached to the main body 11A with the one or more components, including the main wing 12A, attached, to complete the aircraft 10A. Then, the same steps as in S206 to S210 are performed on the aircraft 10A. In this variation, after the main body 11B has moved to the second story 52 of the assembly building 50, by the time the aircraft 10A is completed at the earliest, the one or more components, including the main wing 12B, are attached to the main body 11B on the second story 52 of the assembly building 50, as in step S203. Then, the same steps as in S204 to S210 are performed on the next aircraft. In this variation, after the main body 11B has moved to the second story 52 of the assembly building 50, by the time the one or more components are attached to the main body 11B at the earliest, a main body 11C of the next aircraft is assembled on the first story 51 of the assembly building 50, as in step S201. Therefore, on the first story 51 of the assembly building 50, the assembled main body 11C is placed on the fourth movable floor 84. Then, the same steps as in S202 to S210 are performed on the yet next aircraft.

Figure 24:
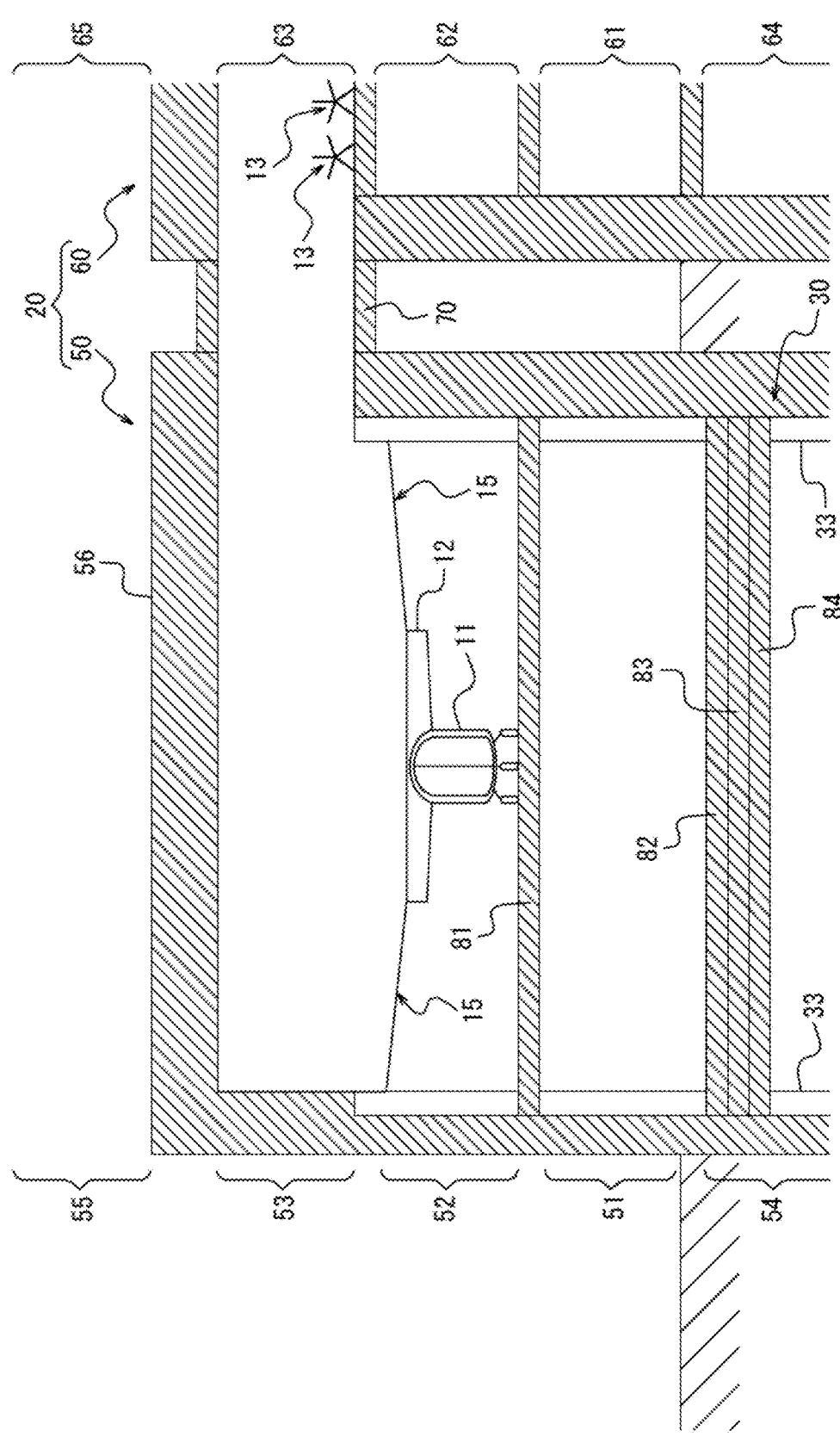
FIG. 24 is a schematic cross-sectional view of the manufacturing facility, corresponding to S202 in a variation.

As illustrated in FIG. 24, the movement mechanism 30 may have rails 33 that support the vertically movable floors in a slidable manner, instead of the vertically extendable bars 32. The number of rails 33 is two or more. In S202 in such a variation, as illustrated in FIG. 24, the movement mechanism 30 slides the first movable floor 81 along the rails 33, thereby moving the main body 11, together with the first movable floor 81, to the second story 52 of the assembly building 50. Upon moving the first movable floor 81 to the second story 52 of the assembly building 50, the movement mechanism 30 locks the first movable floor 81 until a work of attaching the one or more components to the main body 11 is completed in S203. Upon unlocking the first movable floor 81 in S204, the movement mechanism 30 moves the first movable floor 81 to the third story 53 of the assembly building 50 by further sliding the first movable floor 81 along the rails 33. Upon moving the first movable floor 81 to the third story 53 of the assembly building 50, the movement mechanism 30 locks the first movable floor 81 until a work of completing the aircraft 10 is completed in S205. Operations of locking and unlocking the second movable floor 82, the third movable floor 83, and the fourth movable floor 84 are the same as those of locking and unlocking the first movable floor 81, so descriptions thereof are omitted. Even in a case in which the movement mechanism 30 has the bars 32, as in a case in which the movement mechanism 30 has the rails 33, the movement mechanism 30 may lock and unlock the first movable floor 81, the second movable floor 82, the third movable floor 83, and the fourth movable floor 84.

In S206, the movement mechanism 30 moves the completed aircraft 10 horizontally on the top story, but in another variation, the movement mechanism 30 may move an uncompleted aircraft 10 horizontally on the top story. For example, the second story 52 of the assembly building 50 may correspond to a top story, and in such a case, the movement mechanism 30 may horizontally move, on the top story, the main body 11 with the one or more components attached. In such a variation, the other components are attached to the horizontally moved main body 11 that has the one or more components attached, to complete the aircraft 10. The movement mechanism 30 then moves the completed aircraft 10 downward. Alternatively, the movement mechanism 30 may move the horizontally moved main body 11 that has the one or more components attached, downward as is. The other components may then be attached to the downward moved main body 11 that has the one or more components attached, to complete the aircraft 10. The aircraft 10 is inspected on the same or lower story, after the completion of the aircraft 10.

When the roof 56 is retractable, the completed aircraft 10 may be inspected on the top story, and the aircraft 10 after the completion of the inspection may take off directly. Alternatively, the movement mechanism 30 may move the aircraft 10 after the completion of the inspection to the rooftop story 55 by any method, and then the aircraft 10 may take off from the rooftop story 55. Alternatively, after the movement mechanism 30 further moves the aircraft 10 from the rooftop story 55 to the storage building 60, the aircraft 10 may take off from the rooftop story of the storage building 60.

When the roof 56 is retractable, after an aircraft landed on the top story is serviced on the top story, the movement mechanism 30 may move the aircraft downward. Alternatively, the movement mechanism 30 may move an aircraft landed on the top story downward, and the downward moved aircraft may be serviced on a story below the top story.

The present disclosure is not limited to the embodiment described above. For example, instead of executing two or more steps described in the flowchart in chronological order in accordance with the description, the steps may be executed in parallel or in a different order as required. Other modifications can be made without departing from the spirit of the present disclosure.

Examples of some embodiments of the present disclosure are described below. However, it should be noted that the embodiments of the present disclosure are not limited to these examples.

[Appendix 1] A multi-story manufacturing facility comprising a movement mechanism configured to:

move, to a second story above a first story, a main body of an aircraft assembled on the first story; and after one or more components have been attached to the main body on the second story, move, to a third story above the second story, the main body with the one or more components attached.

[Appendix 2] The manufacturing facility according to appendix 1, comprising a floor with an opening on the second story, wherein the movement mechanism is configured to move the main body to the second story through the opening in the second story.

[Appendix 3] The manufacturing facility according to appendix 2, wherein the movement mechanism has a conveyor configured to, while being loaded with the main body, move upward through the opening in the second story.

[Appendix 4] The manufacturing facility according to appendix 2 or 3, wherein the floor is provided with a horizontally movable scaffold for a worker who attaches the one or more components to the main body, and the movement mechanism is configured to, upon moving the main body to the second story, move the scaffold closer to the main body than a perimeter of the opening in the second story.

[Appendix 5] The manufacturing facility according to any one of appendices 2 to 4, comprising another floor with an opening on the third story, wherein the movement mechanism is configured to move, to the third story through the opening in the third story, the main body with the one or more components attached.

[Appendix 6] The manufacturing facility according to appendix 5, wherein the opening in the second story is shaped according to a shape of the main body, and the opening in the third story is larger than the opening in the second story, and is shaped according to a shape of the main body with the one or more components attached.

[Appendix 7] The manufacturing facility according to appendix 1, further comprising a vertically movable floor on which the main body is placed, wherein the movement mechanism is configured to move the main body to the second story by moving the floor from the first story to the second story.

[Appendix 8] The manufacturing facility according to appendix 7, wherein the movement mechanism has a bar configured to push up and move the floor.

[Appendix 9] The manufacturing facility according to appendix 7, wherein the movement mechanism has a rail configured to support the floor in a slidable manner.

[Appendix 10] The manufacturing facility according to any one of appendices 7 to 9, wherein the movement mechanism is configured to:

upon moving the floor to the second story, lock the floor until a work of attaching the one or more components to the main body is completed; and upon unlocking the floor, move the floor to the third story.

[Appendix 11] The manufacturing facility according to any one of appendices 7 to 10, wherein the movement mechanism is configured to move, to the third story, the main body with the one or more components attached, by further moving the floor from the second story to the third story after the one or more components have been attached to the main body.

[Appendix 12] The manufacturing facility according to appendix 11, comprising a plurality of vertically movable floors including the floor, wherein the movement mechanism is configured to, while or after moving one of the floors to the third story, move another floor to the second story.

[Appendix 13] The manufacturing facility according to any one of appendices 1 to 12, wherein the movement mechanism is configured to move the aircraft to a rooftop story, after the aircraft has been inspected on a top story.

[Appendix 14] The manufacturing facility according to any one of appendices 1 to 12, wherein the movement mechanism is configured to:

on a top story, horizontally move the main body with at least the one or more components attached; and move the horizontally moved main body with at least the one or more components attached, downward.

[Appendix 15] The manufacturing facility according to appendix 14, wherein the movement mechanism is configured to:

after the aircraft has been completed on the top story, move the aircraft horizontally; and move the horizontally moved aircraft downward.

[Appendix 16] The manufacturing facility according to any one of appendices 1 to 15, further comprising, on a story below the first story, a warehouse configured to store each component for the main body.

[Appendix 17] The manufacturing facility according to any one of appendices 1 to 15, further comprising, on a story below the first story, a line configured to manufacture each component for the main body.

[Appendix 18] The manufacturing facility according to any one of appendices 1 to 17, further comprising:

an assembly building in which the aircraft is assembled; and a storage building adjacent to the assembly building, the storage building being configured to store each component for the aircraft, wherein at least one story of the assembly building is connected to at least one story of the storage building.

[Appendix 19] The manufacturing facility according to any one of appendices 1 to 18, wherein the aircraft is an electric vertical take-off and landing aircraft, and the one or more components include a main wing.

[Appendix 20] A method of assembling an aircraft in a multi-story manufacturing facility, the method comprising:

assembling a main body of the aircraft on a first story;

moving the main body to a second story above the first story;

attaching one or more components to the main body on the second story; and moving, to a third story above the second story, the main body with the one or more components attached.

The invention claimed is:

1. A multi-story manufacturing facility comprising a movement mechanism configured to:

move, to a second story above a first story, a main body of an aircraft assembled on the first story; and after one or more components have been attached to the main body on the second story, move, to a third story above the second story, the main body with the one or more components attached, wherein the movement mechanism is configured to move the aircraft to a rooftop story, after the aircraft has been inspected on a top story.

2. The manufacturing facility according to claim 1, comprising a floor with an opening on the second story, wherein the movement mechanism is configured to move the main body to the second story through the opening in the second story.

3. The manufacturing facility according to claim 2, wherein the movement mechanism has a conveyor configured to, while being loaded with the main body, move upward through the opening in the second story.

4. The manufacturing facility according to claim 2, wherein the floor is provided with a horizontally movable scaffold for a worker who attaches the one or more components to the main body, and the movement mechanism is configured to, upon moving the main body to the second story, move the scaffold closer to the main body than a perimeter of the opening in the second story.

5. The manufacturing facility according to claim 2, comprising another floor with an opening on the third story, wherein the movement mechanism is configured to move, to the third story through the opening in the third story, the main body with the one or more components attached.

6. The manufacturing facility according to claim 5, wherein the opening in the second story is shaped according to a shape of the main body, and the opening in the third story is larger than the opening in the second story, and is shaped according to a shape of the main body with the one or more components attached.

7. The manufacturing facility according to claim 1, further comprising, on a story below the first story, a warehouse configured to store each component for the main body.

8. The manufacturing facility according to claim 1, further comprising, on a story below the first story, a line configured to manufacture each component for the main body.

9. The manufacturing facility according to claim 1, wherein the aircraft is an electric vertical take-off and landing aircraft, and the one or more components include a main wing.

10. A method of assembling an aircraft in a multi-story manufacturing facility, the method comprising:

assembling a main body of the aircraft on a first story;

moving, by a moving mechanism, the main body to a second story above the first story;

attaching one or more components to the main body on the second story;

moving, by the moving mechanism, to a third story above the second story, the main body with the one or more components attached; and moving, by the moving mechanism, the aircraft to a rooftop story, after the aircraft has been inspected on a top story.

11. A multi-story manufacturing facility comprising a movement mechanism configured to:

move, to a second story above a first story, a main body of an aircraft assembled on the first story; and after one or more components have been attached to the main body on the second story, move, to a third story above the second story, the main body with the one or more components attached, wherein a floor with an opening is provided on the second story, wherein the movement mechanism is configured to move the main body to the second story through the opening in the second story, wherein another floor with an opening is provided on the third story, wherein the movement mechanism is configured to move, to the third story through the opening in the third story, the main body with the one or more components attached, wherein the opening in the second story is shaped according to a shape of the main body, and wherein the opening in the third story is larger than the opening in the second story, and is shaped according to a shape of the main body with the one or more components attached.

* * * * *